(12) United States Patent
Blake et al.

(10) Patent No.: US 12,273,350 B2
(45) Date of Patent: *Apr. 8, 2025

(54) DYNAMIC GROUPING OF USERS IN AN ENTERPRISE AND WATCH LIST GENERATION BASED ON USER RISK SCORING

(71) Applicant: Target Brands, Inc., Minneapolis, MN (US)

(72) Inventors: Adam Blake, Minneapolis, MN (US); Paul Hutelmyer, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 215 days.

This patent is subject to a terminal disclaimer.

(21) Appl. No.: 17/992,104

(22) Filed: Nov. 22, 2022

(65) Prior Publication Data

US 2023/0231854 A1 Jul. 20, 2023

Related U.S. Application Data

(60) Provisional application No. 63/301,326, filed on Jan. 20, 2022.

(51) Int. Cl.
*H04L 9/40* (2022.01)

(52) U.S. Cl.
CPC ........ *H04L 63/104* (2013.01); *H04L 63/1425* (2013.01)

(58) Field of Classification Search
CPC .............. H04L 63/104; H04L 63/1425; H04L 63/1433
See application file for complete search history.

(56) References Cited

U.S. PATENT DOCUMENTS

| | | | |
|---|---|---|---|
| 8,087,087 B1 * | 12/2011 | van Oorschot | ....... H04L 63/102 726/1 |
| 9,324,119 B2 | 4/2016 | Singh et al. | |
| 9,798,883 B1 | 10/2017 | Gil et al. | |
| 9,836,598 B2 | 12/2017 | Lyer et al. | |
| 10,505,965 B2 | 12/2019 | Moyle et al. | |
| 10,630,706 B2 | 4/2020 | Reddy et al. | |
| 11,770,388 B1 * | 9/2023 | Laconic | .................. H04L 67/12 726/23 |
| 2004/0177080 A1 * | 9/2004 | Doise | ...................... G06F 8/437 |

(Continued)

*Primary Examiner* — Abu S Sholeman
(74) *Attorney, Agent, or Firm* — Barnes & Thornburg LLP

(57) ABSTRACT

Disclosed are techniques for identifying users within an enterprise who pose heightened security risks to the enterprise. A method can include receiving, by a computing system, information about users in the enterprise, grouping the users into groups based on at least one grouping feature and the user information, the at least one grouping feature including, for each of the users, behavior, activity, role, department, region, role-based risk score, event-based risk score, and/or composite risk score, identifying, for each group, normalized behavior of users in the group, generating, for each user in each group, a composite risk score based on deviation of the user's activity from the normalized behavior of the group, identifying, for each group, a subset of users in the group to be added to a watch list, and adding the subset of users to the watch list.

20 Claims, 15 Drawing Sheets

(56) References Cited

U.S. PATENT DOCUMENTS

| | | | |
|---|---|---|---|
| 2004/0268325 A1* | 12/2004 | Moore | G06F 11/3644 |
| | | | 717/140 |
| 2014/0095537 A1* | 4/2014 | Park | G06F 16/2477 |
| | | | 707/770 |
| 2016/0306965 A1* | 10/2016 | Iyer | G06Q 10/0635 |
| 2017/0353483 A1* | 12/2017 | Weith | G06F 16/23 |
| 2018/0027006 A1* | 1/2018 | Zimmermann | H04L 63/0227 |
| | | | 726/11 |
| 2019/0088354 A1* | 3/2019 | Yanowitz | G16H 40/20 |

* cited by examiner

DYNAMIC GROUPING OF USERS IN AN ENTERPRISE AND WATCH LIST GENERATION BASED ON USER RISK SCORING

CROSS-REFERENCE TO RELATED APPLICATIONS

This application claims priority to U.S. Provisional Application Ser. No. 63/301,326, filed on Jan. 20, 2022, the disclosure of which is incorporated by reference in its entirety.

TECHNICAL FIELD

This document generally describes devices, systems, and methods related to computer network security, such as monitoring network activity based on risk scores of users in groups and watch lists.

BACKGROUND

Network security includes policies, practices, and devices adapted to monitor and prevent unwanted access, misuse, modification, or attacks on computer networks and network-accessible resources. Network security involves differentiating and restricting between authorized and unauthorized access to data and services in a network, which can be controlled by one or more authentication schemes. Malicious actors are users that are not authorized to access the network (or particular data and resources of the network) but who nevertheless attempt to circumvent the network's implemented security controls in order to gain access to the network, either by thwarting network security measures or circumventing them by, for example, getting an authorized user to unwittingly perform actions that provide malicious actors with access. For example, malicious actors may either directly attempt to thwart network security measures, such as through an arbitrary execution exploit, or indirectly attempt to gain access through an authorized user, such as through a phishing scheme. Sometimes, malicious actors can come from within an enterprise and can exploit the enterprise's network to their advantage and/or for malicious purposes.

Network security can include proactive and reactive security measures that either block security threats before they exploit a security vulnerability, or the security measures are deployed once the vulnerability has been exploited to mitigate the exploit. Such proactive and reactive security measures can be performed automatically and/or manually, such as by security analysts who are experts in identifying and eliminating security threats in a network. Security analysts can perform a variety of tasks, such as investigating potential security vulnerabilities and instances of potential malicious attacks, differentiating between benign and malicious network activity, and formulating response strategies when malicious attacks are found.

SUMMARY

The document generally relates to dynamic grouping of users within an enterprise and identification of users who pose heightened security risks within those groups based on a variety of factors, such as user role within the enterprise and network activity for those users. For example, users can be assigned risk scores based on a combination of multiple component scores that, collectively, provide an accurate quantitative assessment of a security risk posed by the user to the enterprise. Such scores can encompass multiple different risks that users may pose to an organization, such as risks associated with unintentional acts that pose security threats (e.g., risks associated with users being more vulnerable to security attacks by third parties, such as users who are more susceptible than others to phishing attempts) and risks associated with intentional acts (e.g., users intentionally attempting to steal proprietary, confidential, and/or trade secrets from the organization, such as by transmitting files outside of the organization). Component scores that are used to determine a user's risk score can include, for example, role-based risk scores that indicate risks associated with a user's role within the organization and event-based risk scores that indicate risks associated with a user's specific actions within the organization.

The disclosed technology can provide techniques for accurately assessing whether users pose heightened risks to an organization that warrant additional scrutiny, such as through adding the user to a watch list and by identifying groupings of users and assessing each user's risk score relative to the risks scores for other users within the group (as opposed to comparing risks scores for all users against each other). For example, a user working in a cybersecurity team within an organization may inherently pose a greater risk based on data permissions that the user has relative to a worker in another department with fewer data permissions. To compare the risk scores for those two workers against each other may not accurately identify risks posed by each user. The disclosed technology provides mechanisms by which users can be dynamically grouped with other, similarly situated users within the organization so that a more accurate comparison can be performed. For instance, a risk score for the cybersecurity worker may be better compared against other users with similar high-level data permissions, such as workers in human resources and information technology (IT), and may better be compared against the other users within that dynamic grouping to assess whether the user poses a heightened risk.

Such determinations of risk and dynamic groupings can be determined based on, for example, network activities that users engage in and analysis of activities of users that are added to a watch list to assess what threats, if any, those users pose to the enterprise. Thus, the disclosed techniques provide for dynamically identifying groups of users, determining normalized risk scores within those groups, and identifying outliers within those groups to be added to a watch list (or multiple watch lists). Groups can be generated based on a variety of factors, including but not limited to roles, network behavior, and/or other features that may be monitored by a security system in the enterprise. In some implementations, users can be assigned to multiple groups, and the user's activity and/or risk score in one group may not affect their risk score in another group, thereby allowing for dynamic and real-time analysis of different users throughout the enterprise.

As an illustrative example, users who accessed a particular website over some predetermined period of time (e.g., a past 30 days) can be added to a group. Network activities that are associated with these users can be assessed, by a computing system, in order to determine a benchmark of expected behavior for members of the group (e.g., normalized behavior). The users in the group can then be assigned risk scores based on how their network activities deviate from the expected behavior of the group. The risk scores can be on a scale of 1 to 100, or any other similar scale. Users in the group can be sorted/ranked by their risk scores to evaluate the users against each other. Outliers in the group, such as users having risk scores that deviate from the expected behavior by more than a predetermined amount, can be identified. The outliers can be added to a watch list, where their network activity can continue to be monitored. This additional monitoring can be beneficial to determine whether the outliers pose a threat to the enterprise.

Users can be added to the watch list (or multiple watch lists) based on one or more factors. For example, users that pose potential threats but don't yet have enough data in support of this belief may be added to the watch list. Since these users are on the watch list, their network activity can be monitored and assessed to determine whether in fact the users pose threats to the enterprise. If the computing system determines that a user on the watch list does pose a threat to the enterprise, then the user can be removed from the watch list and a casefile can be generated for that user. The casefile can identify the user and their network activity that poses a threat to the enterprise. In some implementations, if a user on the watch list continues to violate rules or otherwise be associated with network activity that threatens or compromises the enterprise, then the user can be removed from the watch list and a casefile can be generated.

Users may also be added to the watch list based on analysis of types of network activities they engage in over time and/or during some period of time, such as a past 7 days or a past month. For example, users that access websites that are identified, by the security system of the enterprise, as possibly or actually risky during a certain period of time can be added to the watch list. As another example, users who trigger a security event rule for collecting and/or transmitting information that they do not have access to may be added to the watch list. As yet another example, users whose network activities are assigned risk scores that exceed a threshold score value can be added to the watch list. Additionally, as described herein, users may only be added to the watch list based on whether their network activities trigger security event rules—they may not be added to the watch list simply for performing everyday activities.

Furthermore, daily reports can be generated using the watch list to provide for dynamic monitoring of users on the watch list. The daily reports can be outputted to users in the enterprise, such as security analysts. The daily reports can synthesize overall network activity of users on the watch list and/or users in one or more groups or teams. The daily reports can also output changes in behavior over time for users that are part of the watch list, removed from the watch list, and/or part of one or more groups or teams. The daily reports can use supplementary data from the security system in the enterprise to provide a more robust, holistic overview of the users' network activities and behavior. As an example, the daily report can indicate when a user switches from one form of exfiltration to another as a result of being notified to stop performing a current form of exfiltration. This information can be beneficial to more accurately assess whether the user poses a current threat to the enterprise or whether the user has simply made a mistake by triggering one or more security event rules.

One or more embodiments described herein can include a method for identifying users within an enterprise who pose heightened security risks to the enterprise, the method including receiving, by a computing system, information about users in the enterprise, the information including at least a unique identifier associated with each user, grouping, by the computing system, the users into groups based on at least one grouping feature and the information about the users, the at least one grouping feature including, for each of the users, at least one of behavior, activity, role, department, region, role-based risk score, event-based risk score, and composite risk score, identifying, by the computing system and for each of the groups, normalized behavior of the group, which can represent expected behavior of the users in the group, generating, by the computing system and for each of the users in each of the groups, a composite risk score based on deviation of activity associated with the user from the normalized behavior of the group, identifying, by the computing system and for each of the groups, a subset of users in the group to be added to a watch list, adding, by the computing system, the subset of users to the watch list, and storing, by the computing system, the watch list in a data store.

In some implementations, the embodiments described herein can optionally include one or more of the following features. For example, the information about each of the users further can include a role of the user and event alerts that are associated with the user. The method can also include retrieving, by the computing system and from the data store, an event log that is associated with the user, serving up, by the computing system, the event log of the user to analyze activity that is attributed to the user, assigning, by the computing system, the user to at least one group based on the analyzed activity in the event log being within a threshold deviation from the normalized behavior of the at least one group. The method may also include ranking, by the computing system and for each of the groups, the users in the group based on the respective composite risk scores. In some implementations, identifying, by the computing system and for each of the groups, a subset of users in the group to be added to a watch list can be based on at least one of (i) determining that one or more users in the group have composite risk scores that exceed a threshold score and (ii) determining that the one or more users are ranked in a top predetermined quantity of users in the group. Sometimes, the composite risk score can be an aggregation of a role-based risk score and an event-based risk score of the user. Moreover, the method can include generating, by the computing system, a watch list report based on the watch list and transmitting, by the computing system and to a user device, the watch list report to be outputted in a graphical user interface (GUI) display at the user device.

As another example, the method can also include adding, by the computing system, a user in the enterprise to the watch list based on the user satisfying a watch list criteria. The watch list criteria can include a type of user activity that matches an activity type monitored by the watch list. The watch list criteria can also include a frequency of user activity that exceeds a threshold frequency. Moreover, the watch list criteria may include a quantity of user-event alert pairings that exceeds a threshold quantity of pairings. The watch list criteria can also include a casefile not being associated with the user. Additionally, the watch list criteria can include accessing a risky website over a predetermined period of time. In some implementations, the watch list criteria may include the user activity triggering one or more rules associated with authorized users. The watch list criteria can also include a false positive rate of user-event alert pairings that exceeds a threshold rate.

In some implementations, the method can also include ranking, by the computing system, the users in the watch list. The method can also include adding, by the computing system, a user in the enterprise to the watch list based on: determining whether the user is associated with a casefile, determining whether the user is associated with a quantity of event alerts that exceeds a threshold quantity based on a determination that the user is not associated with a casefile, and adding the user to the watch list based on a determination that the user is associated with a quantity of event alerts that exceeds a threshold quantity.

Moreover, the method can include removing, by the computing system, a user from the watch list based on: retrieving an event log associated with the user, serving up the event log to analyze one or more activities associated with the user over a predetermined period of time, determining, based on analyzing the one or more activities associated with the user, whether the user satisfies at least one criteria to be removed from the watch list, and removing the user from the watch list based on a determination that the user satisfies at least one criteria. In some implementations, the at least one criteria can include at least one of (i) an amount of time on the watch list exceeding a threshold amount of time, (ii) a frequency of associated event alerts that is less than a threshold frequency, (iii) a quantity of associated event alerts that is less than a threshold quantity, (iv) one or more risk scores that is less than one or more threshold scores, and (v) a deviation from the normalized behavior of the group that is less than a threshold deviation. Moreover, the method can include determining, based on removing the user from the watch list, whether the user satisfies another criteria to generate a casefile for the user and generating the casefile for the user based on a determination that the user satisfies the another criteria. In some implementations, the another criteria can include at least one of (i) the quantity of associated event alerts exceeding a second threshold quantity, (ii) the frequency of associated event alerts exceeding a second threshold frequency, (iii) the one or more risk scores exceeding one or more second threshold scores, and (iv) the deviation from the normalized behavior of the group exceeding a second threshold deviation. The second threshold quantity, the second threshold frequency, the second threshold scores, and the second threshold deviation can be different than the threshold quantity, the threshold frequency, the threshold scores, and the threshold deviation, respectively. In some implementations, the method can also include transmitting, by the computing system and to a user device, the watch list to be outputted in a GUI display at the user device.

One or more embodiments described herein can also include a system for identifying users within an enterprise who pose heightened security risks to the enterprise, the system having: at least one processor and a memory device storing instructions that are operable, when executed by the at least one processor one or more computers, to cause the at least one processor to perform operations including: receiving information about users in the enterprise, the information including at least a unique identifier associated with each user, grouping the users into groups based on at least one grouping feature and the information about the users, the at least one grouping feature including, for each of the users, at least one of behavior, activity, role, department, region, role-based risk score, event-based risk score, and composite risk score, identifying, for each of the groups, normalized behavior of the group that can represent expected behavior of the users in the group, generating, for each of the users in each of the groups, a composite risk score based on deviation of activity associated with the user from the normalized behavior of the group, identifying, for each of the groups, a subset of users in the group to be added to a watch list, adding the subset of users to the watch list, and storing the watch list in a data store. In some implementations, the system can optionally include one or more of the abovementioned features.

The devices, system, and techniques described herein may provide one or more of the following advantages. For example, the disclosed techniques can provide for using less processing time and compute resources, thereby improving computing efficiency. Dynamic, real-time grouping and analysis of users based on network activity, behavior, roles, and other information can use less compute resources and computing power. Generating groups can be a less time-consuming process since the groups can be continuously updated and/or generated based on detected activity (e.g., behavior) in the enterprise. When a user is added to a group, their network activity can be retrieved and served up to quickly assess whether they pose an internal threat to the enterprise. Similarly, when users are added to the watch list, event logs associated with those users can be retrieved and served up to more efficiently and quickly assess the potential threats they pose and whether casefiles should be generated. Thus, the disclosed techniques can provide for more efficient use of available compute resources and also reduce processing time.

As another example, the disclosed techniques can provide for monitoring and identification of insider threats by adding users to a watch list when they perform suspicious activities but don't yet have enough data to generate casefiles. This can provide security analysts with tools to monitor those identified users and determine whether they in fact pose threats to the enterprise. The watch list can also be dynamically updated in real-time to reflect a changing landscape of potential insider threats in the enterprise. Dynamic updating of the watch list can be beneficial for security analysts to accurately assess, mitigate, and/or prevent potential insider threats. Similarly, the disclosed techniques provide for a security system that is adaptive to different types of information and network activity to assess users relative to their peers and determine whether any of the users pose insider threats to the enterprise.

The disclosed techniques can also provide for more robust and holistic analysis of network activity to identify insider threats by adding users to multiple groups and assessing the users differently in each group (e.g., based on different expected/normalized behavior and other factors unique to the group). The disclosed techniques can therefore be used to more accurately determine if a user poses one or more threats to the enterprise. As an example, a user can be added to 2 groups: one group for users with a same role and the other group for users who access a same website while connected to the enterprise network. The user's network activity can be considered risky in comparison to expected behavior of the first group of users but that same activity may not be considered risky in comparison to expected behavior of the second group of users. The user may be added to the watch list but only so their network activity in relation to the first group (users with the same role) can be assessed and monitored further. Monitoring of this user can therefore be more targeted and based on expected behavior of the first group so that the user is not being monitored based on any and all of their activity. This can be beneficial to hone in on a particular threat or threats the user may pose to the enterprise, if any at all. Security analysts can then respond to the particular threat or threats with more accuracy in mitigation, prevention, and/or remediation efforts.

Additionally, the disclosed techniques can provide for assessing risks that users pose to the enterprise based on making meaningful associations and insights about users in the enterprise. The disclosed techniques provide an ability to define custom groups of users based on anomalous behavior in an enterprise. As a result, an enterprise can accurately and effectively assess which users may pose a threat at a present time, how users have posed threats to the enterprise over time, and what type of threat(s) users may pose to the enterprise.

As another example, the disclosed techniques provide a sliding scale, so-to-speak, for generating blocks and alerts. For example, individuals who pose ongoing and/or concerted threats to the enterprise may have a lower threshold for blocking than other individuals who do not pose ongoing and/or concerted threats, which may especially be true if the individuals with the ongoing and/or concerted threats have been notified of previous alerts. The sliding scale approach therefore provides for potentially concerning activities to be treated differently based on individual and/or security watch list groups of which the activities are associated.

The details of one or more implementations are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

This document generally relates to monitoring network activity for potential insider threats in an enterprise based on dynamic grouping and assessment of users and watch list generation. Users can be added to one or more groups in an enterprise, based on a variety of factors. For example, groups can be generated based on type of network activity, user behavior, roles, and other information. Users can be assigned to multiple different groups. A combination of group assignments may also indicate how risky the user is within the enterprise. For example, if the user is assigned to multiple high risk groups, then the user may pose a greater threat to the enterprise than a user who is assigned to many groups but only one high risk group. Moreover, user assignment to groups can change in real-time, such as multiple times in a day, which further may impact an overall risk score of the user.

Within each group, users' network activity can be compared to determine user risk scores. The users can be ranked in the group based on their risk scores. Users having risk scores that deviate by a threshold amount from expected or normalized behavior for the group can be added to a watch list. Once on the watch list, a user's network activity can continue to be monitored until it is determined that the user does not pose a threat to the enterprise (and is removed from the watch list) or enough data is collected about the user's network activity to remove the user from the watch list and generate a casefile. Using the disclosed techniques, insider threats can be more accurately and efficiently identified, mitigated, and/or prevented to improve/maintain security within the enterprise.

Figure 1:
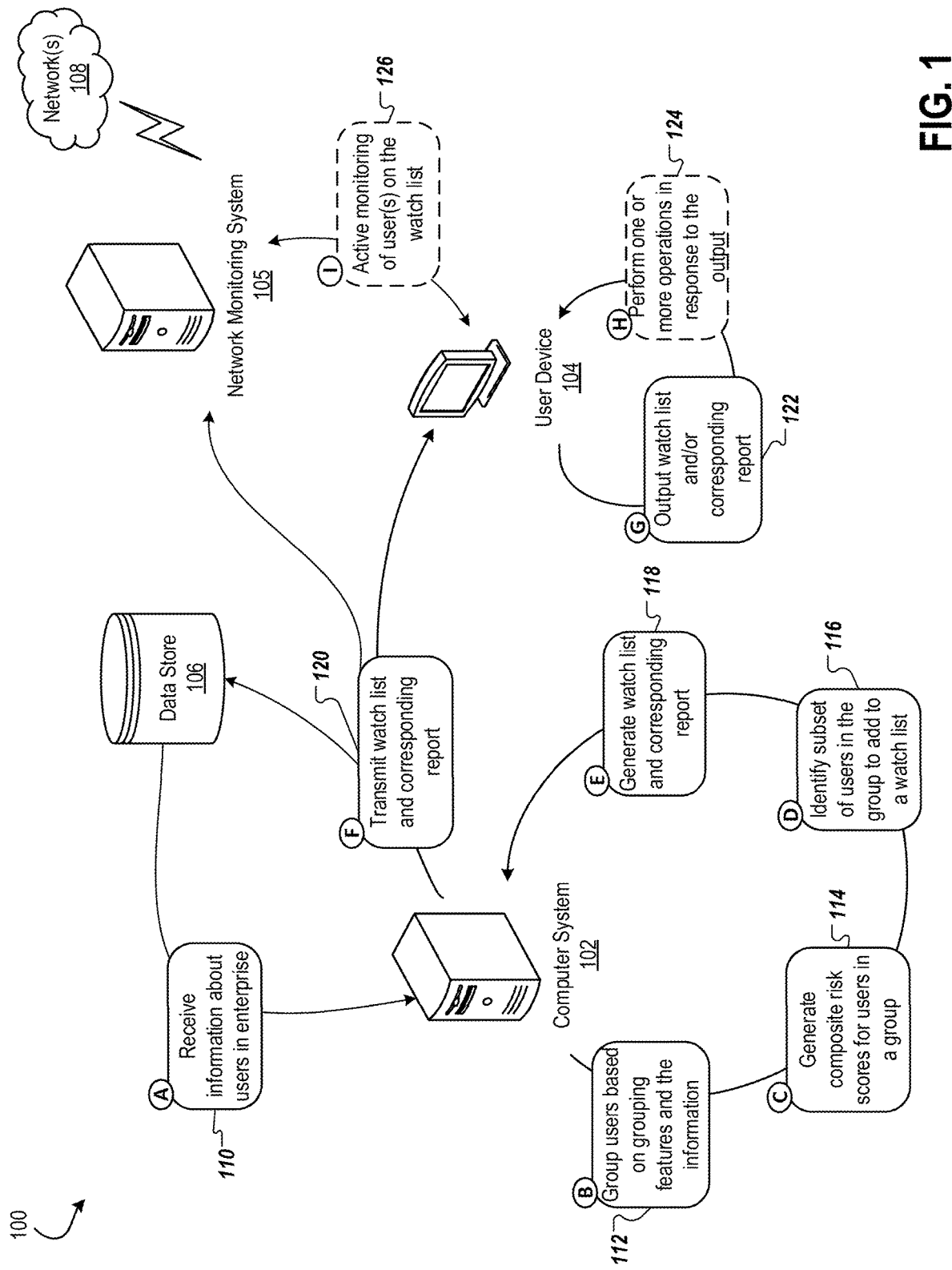
FIG. 1 is a conceptual diagram for assessing network activity of users in an enterprise.

Referring to the figures, FIG. 1 is a conceptual diagram for assessing network activity of users in an enterprise 100. The enterprise 100 can be an organization, business, corporation, or other grouping/network of users. The enterprise 100 can include devices, computing systems, and/or users that are located near each other or within a local area network (LAN). The enterprise 100 can also include devices, computing systems, and/or users that are not all located near each other or within the LAN. For example, one or more of the devices, computing systems, and/or users can be remote from other devices, computing systems, and/or users in the enterprise 100.

A computer system 102 can communicate with a user device 104, a data store 106, and a network monitoring system 105 via network(s) 108. The computer system 102 can be configured to group users in the enterprise 100, assess the users' behavior relative to each other, score the users based on the risk(s) they may pose to the enterprise 100, add one or more of the users to a watch list (or watch list), and monitor the users in the watch list. In some implementations, the computer system 102 can be a security system in the enterprise 100. In some implementations, the computer system 102 can be in communication (via the network(s) 108) with a security system of the enterprise 100. One or more of the techniques described herein can also be performed by multiple computing systems in communication with each other via the network(s) 108 rather than just at the computer system 102.

The user device 104 can be a computing device (e.g., mobile device, mobile phone, laptop, computer, tablet, etc.) of a user in the enterprise 100. The user device 104 can be a personal device. The user device 104 may also be a device that is owned by or otherwise part of the enterprise 100. Users in the enterprise 100 can include but are not limited to employees, staff, relevant stakeholders, and/or security analysts. For example, employees in the enterprise 100 can use the user devices 104 to perform their job functions and responsibilities. Sometimes, employees in the enterprise 100 can also use the user devices 104 to perform non-work related activities, such as accessing and responding to personal emails and surfing/browsing the internet. As another example, security analysts can use the user devices 104 to assess potential insider threats, monitor employees' network activity (e.g., behavior), and respond to potential insider threats in the enterprise 100.

The data store 106 can be any type of storage device, including but not limited to a database, data repository, data store, data lake, and/or cloud-based data storage. The data store 106 can store information about the users in the enterprise 100 (e.g., role information, privileges, role-based risk scores, event-based risk scores, composite risk scores, behavior risk scores, group association(s), etc.), logs of network activity, watch lists, watch list reports, and/or user casefiles. One or more other information can also be store in the data store 106. Moreover, one or more of the information described herein can be stored at multiple different storage locations and/or data stores.

The network monitoring system 105 can be a computing system and/or a collection of network devices. The network monitoring system 105 can be configured to collect network activity and flag activity that appears suspicious or poses a high security risk to the enterprise 100. The network monitoring system 105 may or may not be part of a network security system.

Figure 6:
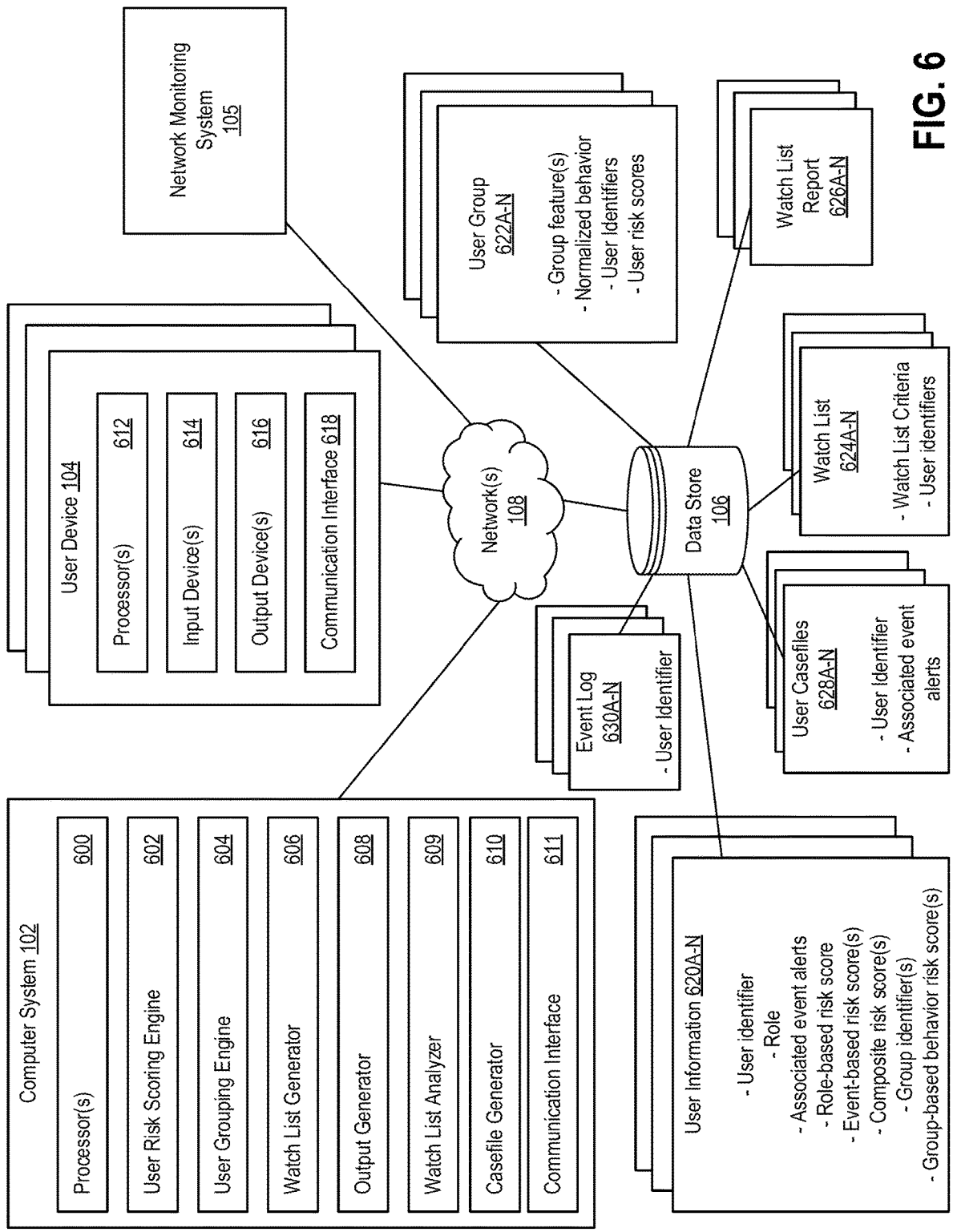
FIG. 6 is a system diagram depicting one or more components that can perform the techniques described herein.

In some implementations, the computer system 102, the user device 104, the data store 106, and/or the network monitoring system 105 can be part of a same computer system, network of devices, cloud-based system, and/or cloud-based service. In yet some implementations, one or more of the components can be separate from each other. Refer to FIG. 6 for further discussion about the system components.

The computer system 102 can receive information about users in the enterprise 100 (step A, 110). This information can be retrieved from the data store 106. The computer system 102 can poll the data store 106 for updated user information. If user information has been updated, the data store 106 can transmit that information to the computer system 102. In some implementations, the data store 106 can transmit the user information at predetermined times, for example, once a day, every 12 hours, once every second day, once a week, etc. The computer system 102 can also poll the data store 106 for the user information at one or more predetermined times.

The computer system 102 can group users based on grouping features and the user information (step B, 112). As described further below, groups can be defined using grouping features. The grouping features can indicate one or more characteristics that some users in the enterprise 100 may have in common. Such grouping features can include but are not limited to role, team, department, region, particular websites or other URLs that are accessed by the users, etc. Combinations of one or more of these features can also be used to define groups in the enterprise 100. Using the grouping features (and combinations of grouping features) can be beneficial to dynamically generate and update groups based on network activity that is occurring in the enterprise 100. These groups can then be used to determine, in real-time or near real-time, which users may pose a current insider threat to the enterprise 100.

Next, the computer system 102 can generate composite risk scores for users in any of the groups (step C, 114). The composite risk scores can be numeric values on a scale of 1 to 100. 1 can be a score associated with a least risky user while 100 can be a score associated with a most risky user. One or more scales can be used for scoring. In addition, users can be allocated predetermined quantities of points based on a comparison of their behavior/activity to behavior of other users in the group, an expected behavior of the group, and/or the user's role. The composite risk score can be a behavior risk score that quantifies the user's behavior relative to behavior of the group. As described further below, expected (or normalized) behavior of the group can be determined. Each user's network activity can then be analyzed relative to the expected behavior of the group to generate the composite risk score. Thus, the composite risk score can be a numeric value that quantifies how risky the user's behavior is in comparison to the user's peers (e.g., the other members in the group).

As described further in FIGS. 7-8, the composite risk score can be an aggregation (e.g., average, summation, or other statistical method) of a role-based risk score and an event-based risk score for a particular user. The role-based risk score can quantify risks associated with the user's role. The event-based risk score can be a dynamic value that quantifies risk associated with one or more network activities and/or behaviors that are attributed to the user. When generating the composite risk score for the user, the role-based risk score can be used to weight the user's event-based risk score. Thus, users can be part of a group that is based on a particular type of network activity, regardless of whether those users share same or similar roles in the enterprise 100.

Each user's role-based risk score can be used as a weight to more accurately determine a potential threat that the user poses to the enterprise 100. A user's role-based risk score can also be used as a tiebreaker when more than one user has a same or similar composite risk score. For example, assume 2 users in the group perform the same or similar network activity and thus are assigned same or similar event-based risk scores. One user can be an executive and the other user can be a software developer. The executive can have more risks associated with their role (because they have access to more proprietary, sensitive information) and thus can be assigned a higher role-based risk score. The software developer can have fewer risks associated with their role (because they do not have access to proprietary, sensitive information) and thus can be assigned a lower role-based risk score. Although the executive and software developer may have the same or similar event-based risk scores, once their respective role-based risk scores are applied as weights, their respective composite risk scores can be different. The executive can have a higher composite risk score than the software developer, and thus, relative to other users in the group, can represent a higher insider threat to the enterprise 100.

The computer system 102 can identify a subset of users in the group to add to a watch list (step D, 116). Users can be added to the watch list if their behavior (e.g., network activity) deviates by a predetermined threshold from the expected behavior of the group. Users can also be added to the watch list if they are associated with risky behavior and do not have casefiles. Users that are added to the watch list may pose a potential insider threat to the enterprise 100 and thus can be monitored by security analysts to determine whether they in fact pose threats to the enterprise 100.

The computer system 102 can use one or more criteria to identify the subset of users in step D (116). For example, the computer system 102 can rank the users in the group based on their composite risk scores. The users can be ranked from highest to lowest scores. Users that are ranked in a top predetermined percentage in the group can be identified in the subset. As another example, users having composite risk scores that are within a predetermined threshold range can be identified in the subset. Users having composite risk scores that exceed some predetermined threshold value can be identified in the subset. As yet another example, users having one or more particular roles and composite risk scores that are within the predetermined threshold range or exceeding the predetermined threshold value can be identified in the subset. As another example, users that are not associated to casefiles but have composite risk scores that exceed the predetermined threshold range or exceed the predetermined threshold value can be identified in the subset of users. One or more other criteria and/or combinations of criteria can be used to identify the subset of users in step D (116).

The computer system 102 can generate the watch list with the subset of users (step E, 118). The computer system 102 can also generate corresponding reports in step E (118). The watch list can be dynamically updated in real-time and based on network activity that is detected and analyzed using the disclosed techniques. Thus, the watch list can continuously change as users are added to or removed from the watch list.

In some implementations, the computer system 102 can generate multiple watch lists. Each watch list can identify a different set of users based on one or more different characteristics or criteria. For example, one watch list can include users from a particular group and another watch list can include users from another group. As another example, one watch list can include users from multiple groups who pose the highest risks in each of their respective groups and another watch list can include users from only a subset of groups who pose one or more other types of risks or meet other criteria.

As mentioned herein, the computer system 102 can generate reports that correspond to the watch list and/or watch lists. The reports can be generated daily (e.g., once a day) and can synthesize overall network activity and/or behavior of one or more users in the watch list. The reports can also include information about changes in activity/behavior of one or more users in the watch list. In some implementations, the reports can include a list of the users in the watch list, ranked from highest risk (e.g., highest composite risk score) to lowest risk (e.g., lowest composite risk score). The users can also be ranked in the watch list using one or more other criteria. The reports can be digestible and can provide relevant users, such as security analysts, with information necessary to make informed decisions about whether users in the watch list in fact pose insider threats to the enterprise 100. The relevant users can, for example, review the reports and determine that one or more of the users should be removed from the watch list because there is sufficient data indicating that those users pose threats to the enterprise 100. Casefiles can then be generated for the users that are removed from the watch list. The casefiles can be used by the relevant users to mitigate, prevent, or avoid threats that may arise from activity of the users that were removed from the watch list.

Still referring to FIG. 1, the computer system 102 can transmit the watch list and corresponding report to the data store 106, the network monitoring system 105, and/or the user device 104 (step F, 120). The watch list and/or corresponding report can be stored in the data store 106 for future retrieval, analysis, and/or further processing. The watch list can be used by the network monitoring system 105 to perform additional monitoring on users that are part of the watch list. Therefore, the watch list can be used to actively monitor particular users who may pose a higher security risk to the enterprise 100 (step I, 126). The network monitoring system 105 can merely monitor network activity associated with users on the watch list more closely. The network monitoring system 105 may also perform one or more deterrent acts, such as preventing access to one or more data files in the enterprise 100. The watch list and/or corresponding report can be output to the user device 104 (step G, 122). As described herein, the user device 104 can be used by a security analyst. The security analyst can review the watch list and/or corresponding report to determine how to respond to potential insider threats in the enterprise 100.

Optionally, the user device 104 can perform one or more operations in response to the watch list and/or corresponding report that is outputted (step H, 124). For example, the user device 104 can send instructions to the computer system 102 that causes the computer system 102 to remove one or more of the users from the watch list that have composite risk scores that exceed some threshold value or range. As another example, the security analyst can select an option presented at the user device 104 to remove one or more of the users form the watch list. The user device 104 can also automatically send instructions to the computer system 102 to alert one or more other relevant users in the enterprise 100 of potential security threats posed by one or more users on the watch list. The one or more other relevant users can include but are not limited to human resources (HR), security personnel of the enterprise, and/or a legal department. The security analyst can also select an option to notify one or more other relevant users about one or more of the users on the watch list. One or more other operations can also be performed in response to outputting the watch list and/or the corresponding report(s) at the user device 104 (steps G-H, 122-124).

Figure 2A:
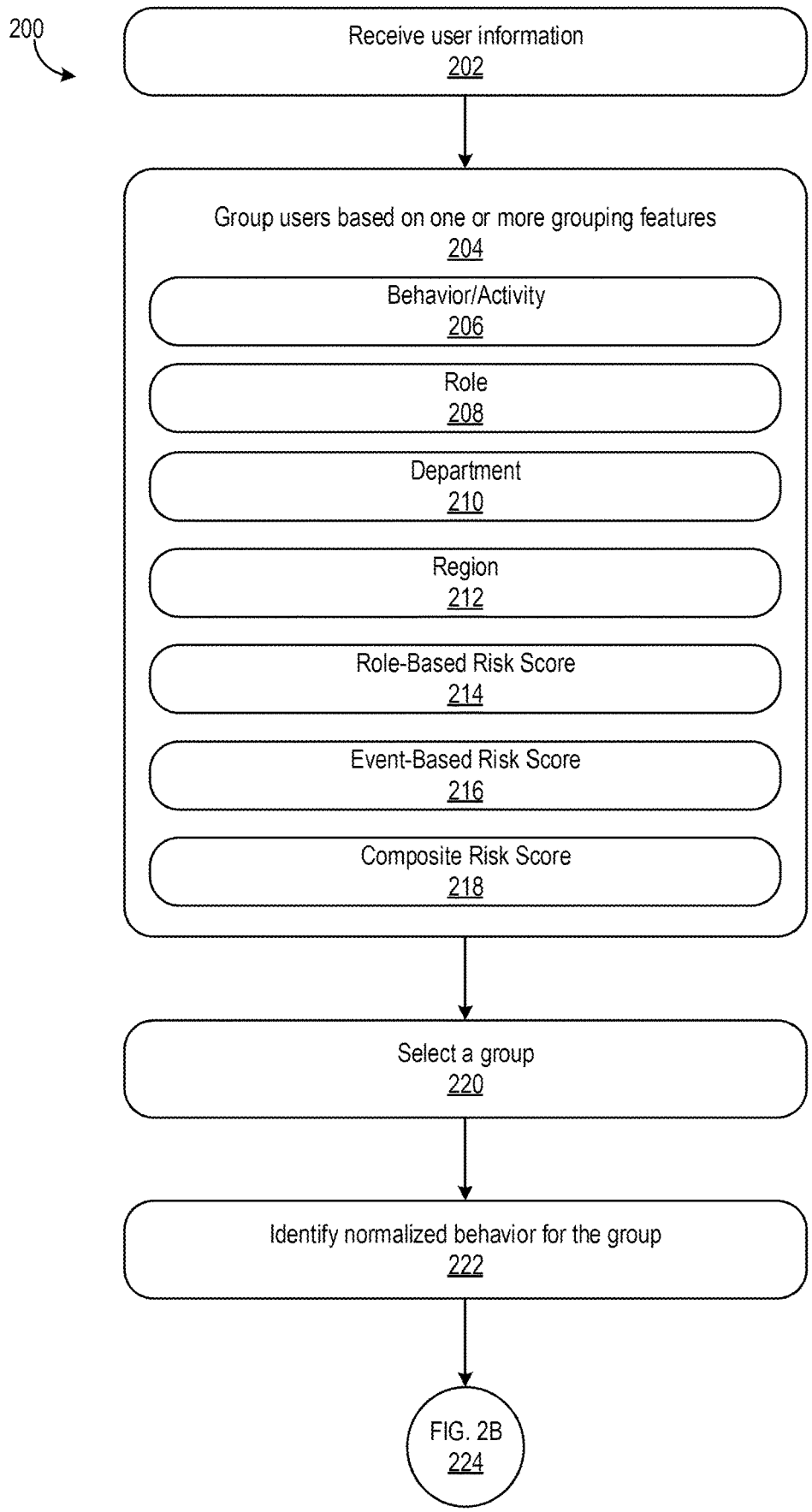
FIGS. 2A-B depict a flowchart of a process for grouping and adding users to a watch list.
Figure 2B:
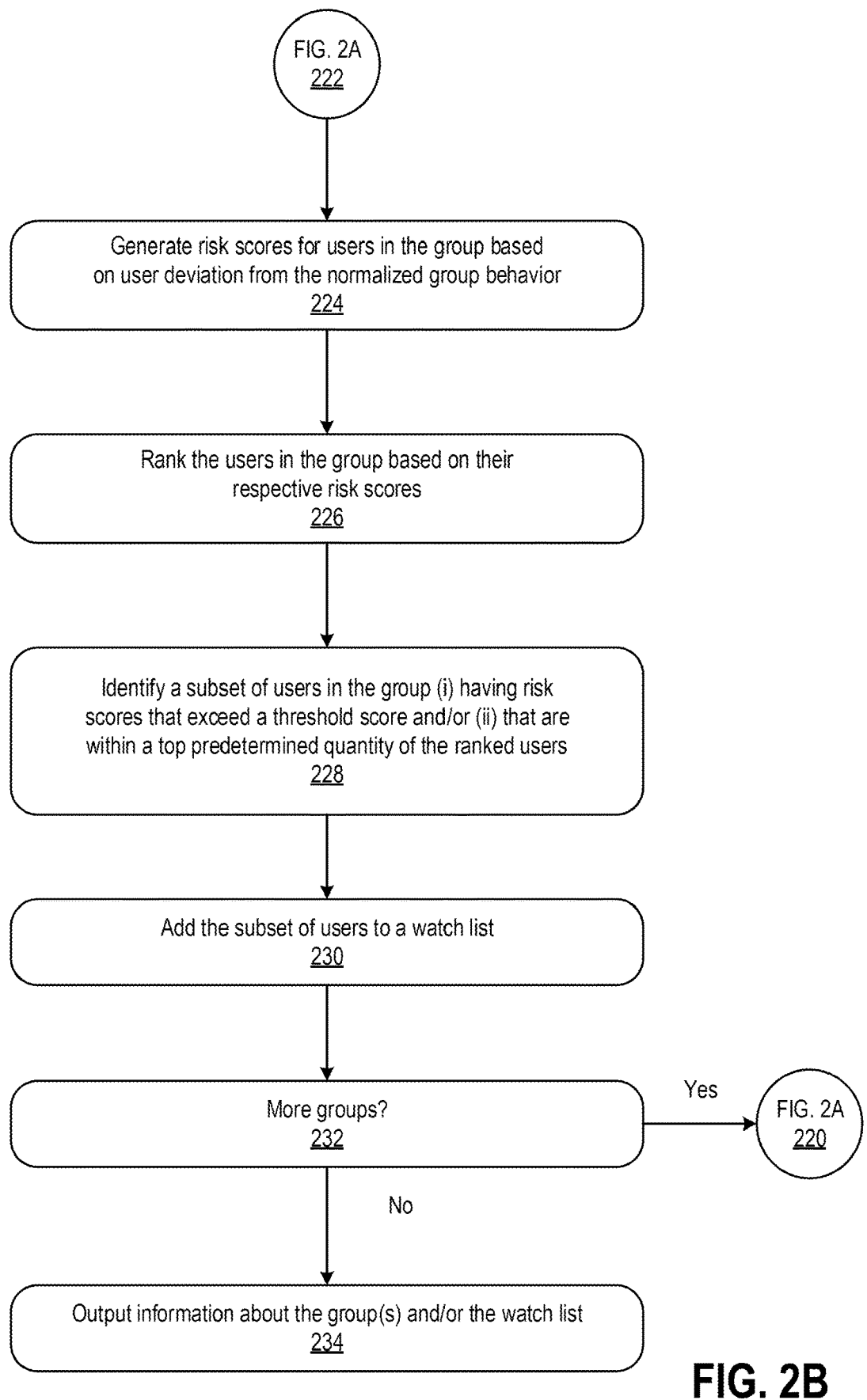

FIGS. 2A-B depict a flowchart of a process 200 for grouping and adding users to a watch list. The process 200 can be performed to group users in an enterprise based on a variety of characteristics, criteria, and combinations thereof. The process 200 can also be performed to identify which users in which groups may pose potential insider threats to the enterprise and thus should be added to a watch list. Sometimes, one or more steps in the process 200 may not be performed.

One or more steps in the process 200 can also be broken up into sub-processes. For example, dynamically grouping users can occur in a first process and adding users to the watch list can occur in a second process. The first and second processes can be performed at a same time. The first and second processes can be performed in parallel. The two processes can also be performed in series. In some implementations, the first and second processes can be performed at different times. For example, the first process can be performed but the second process may not be performed, or the second process can be performed at a later time. In some implementations, only the second process may be performed (e.g., because the users are already grouped and regrouping or updating groups may not be necessary at a present time). One or more other variations on the process 200 are also possible.

The process 200 can be performed by the computer system 102. The process 200 can also be performed by one or more other computing systems, devices, computers, networks, cloud-based systems, and/or cloud-based services. For illustrative purposes, the process 200 is described from the perspective of a computer system.

Referring to the process 200 in both FIGS. 2A-B, the computer system can receive user information in 202. As described in FIG. 1, the user information can be received (or retrieved) from a data store, such as the data store 106. The user information can include a role of the user, a log of network activities that have been associated with the user, an objective identifier(s) of the user, and one or more other information about the user. For example, the user's role-based, event-based, and/or composite risk scores can already be determined. Any one or more of these scores can be retrieved from the data store in 202. Moreover, any other type of information that can be used by the computer system to group users can be retrieved or received in 202.

In 204, the computer system can group users based on one or more grouping features. Grouping users based on a variety of grouping features can be beneficial to develop a more holistic and accurate view of what types of threats may be posed by one or more users in the enterprise. Grouping users based on a variety of grouping features can provide for dynamic group generation based on more than just user roles. Some users can also be assigned to multiple groups. Each group can be assessed in isolation. Thus, a user's risk score in one group may not affect the user's risk score in another group. This can be beneficial to ensure that users are assessed objectively and relative to activity/behavior of a particular group.

The computer system can group users based on one or more grouping features or combinations of grouping features that include but are not limited to: behavior and/or activity (206), role (208), department (210), region (212), role-based risk score (214), event-based risk score (216), and composite risk score (218). One or more of 206-218 can also be combined to generate a group of users. One or more other grouping features can also be used, alone or in combination, to generate groups of users.

In brief, users can be grouped based on behavior and/or activity (206). One or more rules can define types of network activity that may be indicative of insider threats in the enterprise. An example rule can identify users that access a particular website while connected to the enterprise network or using a user device, such as the user device 104. Those identified users can be grouped together. Another example rule can identify users that transmit at least a threshold quantity of information via personal email while connected to the enterprise network or using a user device, such as the user device 104. Those identified users can be grouped together. Yet another example rule can identify users that access a particular resource and search for particular tools (e.g., tools that can be used for hacking any enterprise). Those identified users can be grouped together. Another example rule can identify users that collect or otherwise access information that they do not have access to. Those identified users can also be grouped together. One or more other rules can be defined and used to dynamically generate groups of users.

Users can also be grouped based on their role (208). For example, users having a particular role can be grouped. Users that have been working in the enterprise for a predetermined amount of time can be grouped together. Users having different roles but similar or same risks associated with their roles can be grouped together. One or more rules can be defined and used to identify users to group together based on their role information.

Users can be grouped based on department (210). For example, users operating in the same department but at different networks across the enterprise can be grouped together. As an illustrative example, the enterprise can include multiple geographically different offices that all have the same departments. Users in each of those departments can be grouped together.

Users can also be grouped based on region (212). For example, users operating in the same geographic region can be grouped together. As an illustrative example, users operating in a particular country can be grouped together. Users operating in geographic regions that are within some predetermined threshold distance from each other can be grouped together.

Users can also be grouped together based on role-based risk scores (214). For example, users having role-based risk scores within a predetermined score range can be grouped together. Users having role-based risk scores that are less than a predetermined threshold score can be grouped together. Similarly, users having role-based risk scores that are greater than a predetermined threshold score can be grouped together.

Likewise, users can be grouped together based on their event-based risk scores (216). The users can also be grouped together based on their composite risk scores (218).

As described herein, the users can further be grouped together based on a combination of one or more of the grouping features 206-218. Grouping users based on a combination of grouping features can be beneficial to dynamically generate groups that take into account anomalous behavior and various information about users to accurately assess potential insider threats in the enterprise.

For example, users can be grouped together based on behavior/activity (206) and role (208). Thus, users that (i) engage in same or similar identified behavior and (ii) have an identified role can be grouped together. As an illustrative example, all software developers that have been at the enterprise for 2 years and have accessed a particular internet source at least 3 times over the course of 30 days can be grouped together. The users can be grouped together using more granular or less granular rules. A less granular rule can, for example, require all software developers that accessed the particular internet source over a past 7 days to be grouped together.

As another example, users can be grouped together based on behavior/activity (206), department (210), and event-based risk score (216). Thus, users that (i) engage in same or similar identified behavior, (ii) are within a same or similar department, and (iii) have a particular event-based risk score (or an event-based risk score that is within a predetermined threshold range or greater than a predetermined threshold score) can be grouped together. As an illustrative example, any user in a marketing department who accesses a particular type of sensitive information and is assigned a corresponding event-based risk score that is greater than a predetermined threshold score can be grouped together. The users can be grouped together using more granular or less granular rules.

The rules that are used for grouping users can be determined by security analysts of or other relevant stakeholders in the enterprise. In some implementations, the rules can be dynamically and automatically generated by the computer system. For example, the computer system can generate and fine tune one or more grouping rules based on historic analysis of behavior and activity in the enterprise.

In some implementations, the process 200 can stop after the users are grouped. Remaining blocks of the process 200 can be performed separately and/or at another time.

Still referring to the process 200, the computer system can select a group in 220 once the users are grouped using the grouping features described above. The computer system can randomly select a group of users to analyze. The computer system can also select a group of users to analyze based on whether the group has previously been analyzed (e.g., and thus whether expected behavior has already been determined for the group). The computer system may select a group of users based on determining that the group has been updated (e.g., such as new users being added to the group, and within a predetermined period of time, such as a past day, a past 3 days, a past week, etc.). The computer system can also select a group of users based on determining that information associated with at least one user in the group has been updated/changed. The computer system can also select any of the groups to perform routine checks/updates on the expected behavior of the group and/or users in the group (e.g., at predetermined time intervals, such as once a day, once every other day, once every 3 days, once a week, etc.).

Once the computer system selects a group, the computer system can identify normalized behavior for the group (222). By identifying the normalized or expected behavior of the group, the computer system can accurately compare and assess users in the group relative to each other. The computer system can analyze behavior of each of the users in the group. The computer system can identify trends in behavior to determine what behavior is most commonly performed or otherwise associated with users in the group. This behavior can be identified as the normalized or expected behavior. Therefore, the computer system can identify average behaviors of the group based on criteria, such as by grouping similar entitlement actors and/or access factors/characteristics. As described further below, the computer system can then identify users who deviate from the average behaviors of the group. As another example, the computer system can identify event-based risk scores or composite risk scores for the users in the group. The computer system can determine an average score for the users in the group and identify that score as the normalized or expected behavior of the group.

The computer system can also generate risk scores for users in the group based on assessing user deviation from the normalized group behavior (224). The computer system can generate any one or more of role-based, event-based, and/or composite risk scores that are described throughout this disclosure. In some implementations, the users may already be assigned risk scores, such as the role-based, event-based, and/or composite risk scores. Thus, in 224, the computer system can identify how much the users' score(s) deviate from the average risk score of the group (which represents the normalized or expected behavior of the group). As a result, the computer system can assess users relative to their peers in the group. In some implementations, the computer system can regenerate or otherwise update one or more user risk scores based on assessment of the user's behavior relative to the normalized behavior of the group.

In yet some implementations, the computer system can generate new user risk scores based on comparing each of the users' behavior, existing scores, or other user information to the normalized behavior of the group. For example, the computer system can assign a numeric value to a user based on how much the user's behavior deviates from the normalized behavior of the group. This numeric value can be the user's risk score. The numeric value can be a score, such as on a scale of 1 to 100. Points can be allocated to the user's risk score based on how much the user deviates from the normalized behavior. In some implementations, risk scoring within a group can scale from 1 to 10, where 5 can be an average volume of access level and 10 can be a riskiest or most voluminous amount of transmissions or entitlements within the group. Moreover, in some implementations, a bell curve can be established for a group to identify outliers and/or mean scores.

The computer system can rank the users in the group based on their respective risk scores (226). Users can be ranked to determine which users may pose an insider threat to the enterprise and/or which users pose a more significant threat to the enterprise. In other words, users can be ranked in the group to determine which users are risky and which users are not as risky. The users can be ranked from highest risk score to lowest risk score. In other words, the users can be ranked based on how much they deviate from the normalized behavior of the group. Users that deviate the most from the normalized behavior can be ranked higher than users that deviate less from the normalized behavior. Moreover, users whose activity aligns with the normalized behavior can be ranked last.

In some implementations, the normalized behavior can represent bad or malicious activities that likely pose threats to the enterprise. For example, all individuals within a group could have been previously identified as posing risks to the enterprise. Lower scores within such a group and longer periods of time since a first offense can therefore indicate that a particular user can be removed from the group. If, however, the another risk is identified for that user, the user's score can increase and they can remain within the group. As an illustrative example, the normalized behavior for a particular group can include accessing a particular webpage and downloading content from that webpage. In such a scenario, users in the group can be ranked from lowest to highest risk score, where the lowest risk score indicates that the user is least likely accessing the particular webpage and downloading content from that webpage over some period of time. The lowest risk score can represent a lesser likelihood that the user is an insider threat to the enterprise. The highest risk score can represent a greater likelihood that a user poses an insider threat to the enterprise.

In some implementations, the computer system may not perform block 226. Instead, the computer system can proceed from block 224 to block 228.

In 228, the computer system can identify a subset of users in the group (i) having risk scores that exceed a threshold score and/or (ii) that are within a top predetermined quantity of the ranked users. The subset of users can be identified to determine which users in the group should be added to a watch list for additional monitoring. Not every user in the group may be acting in such a way that warrants further monitoring and/or casefile generation. Moreover, not every user in the group may be engaging in activity that is suspicious enough to identify the user as very risk or most risky to the enterprise.

Accordingly, the computer system can use one or more criteria/rules to identify the subset of users that can be added to the watch list. For example, the computer system can identify a subset of users based on (i). The computer system can also identify a subset of users that have risk scores within a predetermined score range. As another example, the computer system can identify a subset of users based on (ii). In some implementations, for example, the computer system can identify a top ranked user in the group to add to the watch list. As another example, the computer system can identify a top 5 ranked users in the group to add to the watch list. One or more other criteria can be used to identify the subset of users that can be added to the watch list. For example, in some implementations, the watch list may be defined as an aggregate of lower level risks where users are particularly quiet on low severity lists but may present a constant behavioral pattern of testing controls or policy violations. This behavior may therefore indicate successful avoidance of the controls in the enterprise. Users associated with this behavior can be added to the watch list because additional analysis may be required to determine why these users are not as visible as they once were in a particular group and/or with behavioral pattern changes.

The computer system can then add the subset of users to a watch list in 230. Users can be added to the watch list to provide more coverage about what types of activities and which users may pose insider threats to the enterprise. Users that are added to the watch list can be monitored to generate more robust casefiles and/or to identify isolated incidents of threats to the enterprise. The watch list can provide a means for serving up and analyzing data from different sources that correspond to a particular user's behavior/activity in the enterprise. As a result, the disclosed techniques can provide for more efficiently utilizing computing power and resources to dynamically assess users in the watch list based on their behavior/activity.

In some implementations, blocks 228-230 may not be performed in the process 200. Rather, blocks 228-230 can be performed in another process, at a different time than the blocks 202-226. Thus, the computer system can group the users and score/rank the users within each group in one process. In another process, and/or at another time, the computer system can assess each group to determine which users in the group should be added to a watch list.

Still referring to the process 200, the computer system can determine whether there are more groups to assess in 232. For example, the computer system can determine whether one or more other groups have been updated to include new users and/or remove users. The computer system can also determine whether one or more groups have been updated based on new information being associated with at least one user in the group. In some implementations, the computer system can determine whether one or more other groups have yet to be analyzed and/or have not been analyzed in more than a predetermined amount of time. If there are more groups to analyze, the computer system can return to block 220 and repeat blocks 222-230 for each remaining group. If there are no more groups to assess, the computer system can proceed to block 234.

In 234, the computer system can output information about the group(s) and/or the watch list. As described herein, the information can be transmitted to a user device, such as the user device 104, to be presented in a graphical user interface (GUI) to a relevant user, such as a security analyst. The information can include reports, such as daily reports, that include the watch list and/or information about one or more users that are part of the watch list. The reports can also include one or more of the groups. The reports can also include one or more users and information identifying which groups those users are associated with. In some implementations, the reports can indicate user rankings in one or more groups, user behavior/activity, and/or user rankings in the watch list.

The information that is outputted about the group(s) and/or watch list can further be culled/filtered by the relevant user, such as the security analyst. The security analyst can, for example, request, at the user device, to view only information about users that are part of a particular group or users in that particular group that have been added to the watch list. Thus, the security analyst can focus their review of the watch list on a particular grouping of users instead of all the users.

As another example, the security analyst can request to view only information about users that have been most recently added to the watch list (e.g., within a predetermined amount of time, such as a past day, a past 3 days, a week, etc.). Therefore, the security analyst can focus their review of the watch list on users that may pose a threat to the enterprise at a present/current time. As yet another example, the security analyst can request to view only information about users that have been sitting on the watch list for more than a predetermined amount of time. As a result, the security analyst can assess information about such users to determine whether those users in fact pose security threats to the enterprise, whether those users can be removed from the watch list, and/or whether casefiles can be generated for those users. One or more other information can be outputted and presented to the relevant user(s) in the enterprise.

Figure 3A:
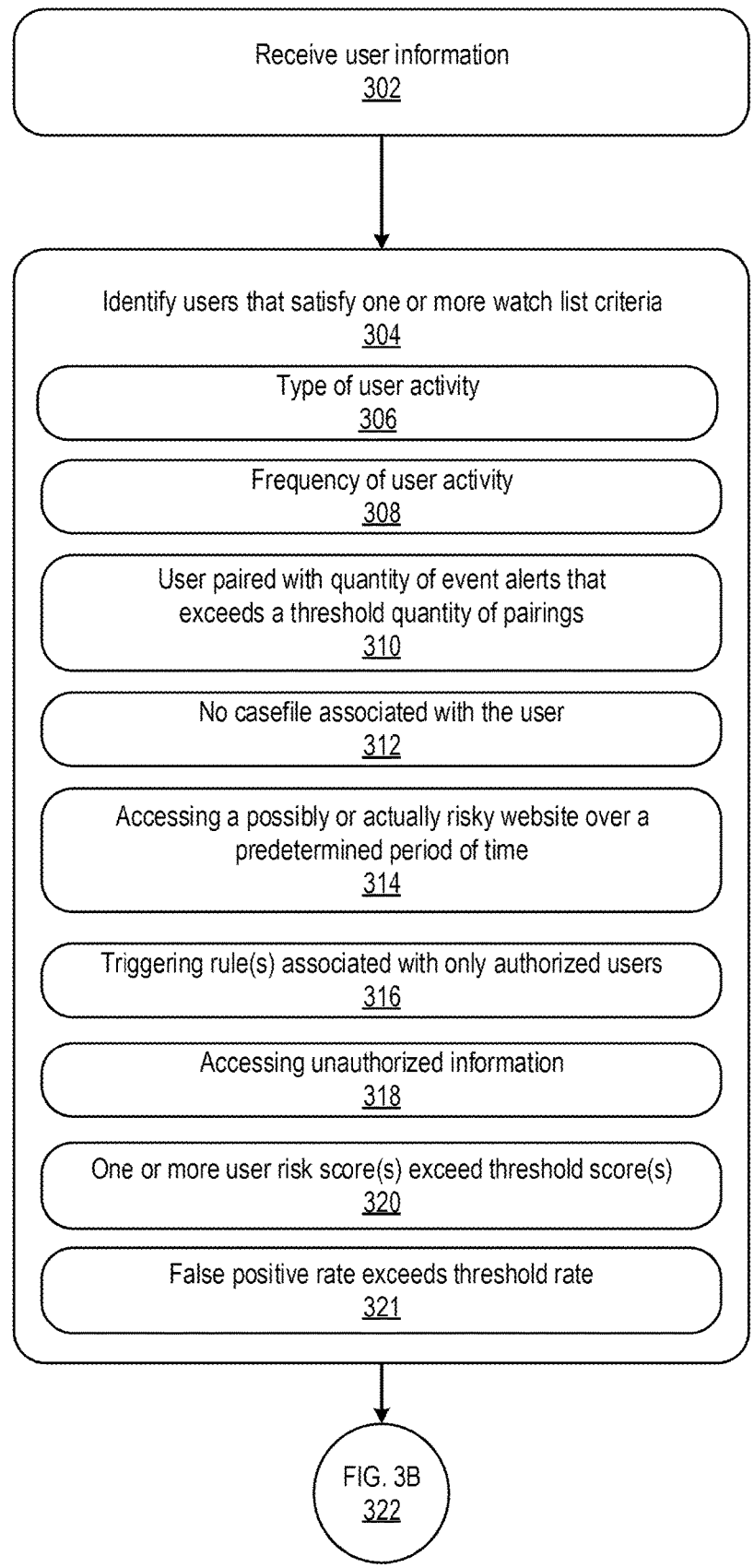
FIGS. 3A-B depict a flowchart of a process for adding users to a watch list.
Figure 3B:
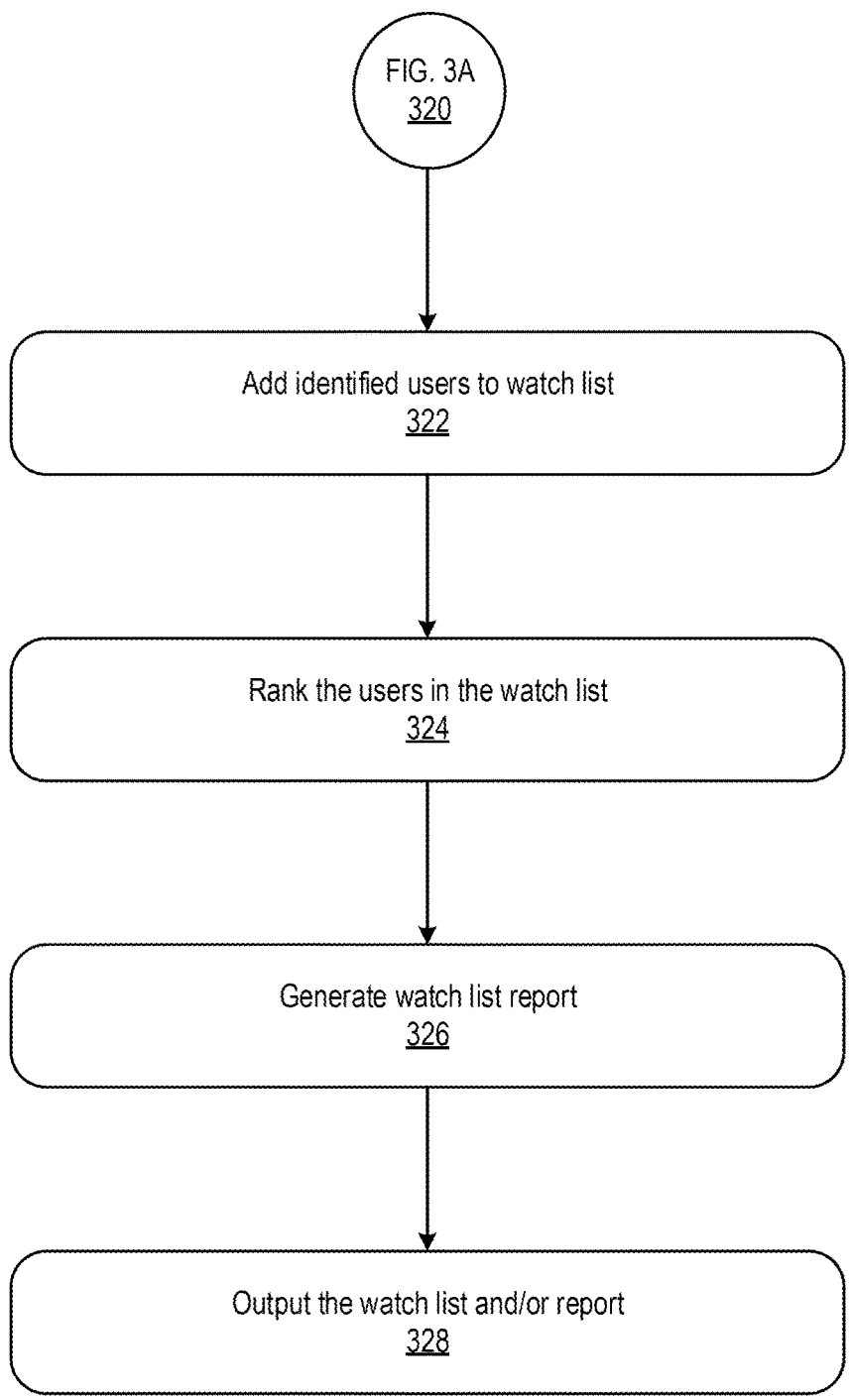

FIGS. 3A-B depict a flowchart of a process 300 for adding users to a watch list. The watch list can provide coverage of potential insider threats to the enterprise. These insider threats (e.g., suspicious users) can be monitored to build strong, robust casefiles and thus identify, mitigate, and/or prevent security threats in the enterprise. The watch list can be used to identify repeat offenders as well as isolated incidents of intentional malicious activity and benign activity. Sometimes, a watch list (or multiple watch lists) can be generated each day (e.g., every 24 hours). The watch list can be updated daily (e.g., every 24 hours) to indicate what activities are presently occurring in the enterprise that raise suspicions of insider threats. The watch list can therefore be dynamically generated and/or updated to provide most current information about potential insider threats to relevant users, such as security analysts. As a result, the security analysts can be prepared and effective in identifying, mitigating, preventing, or otherwise responding to insider threats and other security threats from within the enterprise.

The process 300 can be used to add users who are already part of a group or groups to the watch list. In some implementations, the process 300 can be used to add users to the watch list even if they are not part of any groups. Thus, the process 300 can be used to add any users to the watch list, regardless of whether the process 200 in FIGS. 2A-B is performed. The process 300 can be performed before grouping users (e.g., before block 204 in the process 200 in FIGS. 2A-B). In some implementations, the process 300 can be performed as part of identifying a subset of users in the group to add to the watch list in block 228 in the process 200 in FIGS. 2A-B. The process 300 can therefore be performed as part of the criteria to identify the subset of users from a group that should be added to the watch list.

The process 300 can be performed by the computer system 102. The process 300 can also be performed by one or more other computing systems, devices, computers, networks, cloud-based systems, and/or cloud-based services. For illustrative purposes, the process 300 is described from the perspective of a computer system.

Referring to the process 300 in both FIGS. 3A-B, the computer system can receive user information in 302. Refer to block 202 in the process 200 of FIGS. 2A-B for further discussion. In 304, the computer system can identify users that satisfy one or more watch list criteria. Satisfying any one or more of the criteria (and/or at least a threshold quantity of the criteria) may be sufficient to add the user to the watch list. For example, the computer system can determine whether each of the users satisfy criteria for: a type of user activity (306), frequency of user activity (308), being paired with a quantity of event alerts that exceeds a threshold quantity of pairings (310), not having a casefile associated with the user (312), accessing a possibly or actually risky website over a predetermined period of time (314), triggering a rule or rules that are associated with only authorized users (316), accessing unauthorized information (318), one or more risk scores of the user exceeding one or more threshold scores (320), and/or a false positive rate exceeding a threshold rate (321). This list of criteria is non-exhaustive. One or more other criteria can also be used to determine whether users should be added to the watch list. Criteria can be generated for enterprises based on their particular needs, business, types of employees and other relevant users, types of information and activities within the enterprise, types of roles and responsibilities, etc. Moreover, any one or more of the criteria can be combined to determine whether the user should be added to the watch list.

In brief, the type of user activity (306) can be defined in rules as one or more activities that may be identified (for example, by security analysts) as threatening or potentially threatening to the enterprise. For example, one such rule can define accessing a particular website while connected to the enterprise network as a criteria for being added to the watch list. The rules, as described in reference to the rules in blocks 206-218 can be less granular or more granular (e.g., refer to the process 200 in FIGS. 2A-B). As described herein, the received user information (302) can include one or more tags that identify type of activity that the user is associated with (from event logs or pairing of the user with network activity). The computer system can identify the tags in the user information and determine whether any of the tags match the rules for type of user activity (306) that warrants being added to the watch list. If any of the tags match, then the user can be flagged and added to the watch list.

The frequency of user activity (308) criteria can also be defined in rules as a threshold quantity of occurrences of a particular type of activity or multiple/different activities and/or a timeframe in which the activity occurred/was paired with the user. As an example, if a user accessed a particular website more than 3 times over the course of 1 week, the user can satisfy this criteria and can be added to the watch list. As another example, if a user transmitted more than a predetermined amount of content via their personal email at least 3 times after the user received a warning or some other notification to stop this activity, then the user can satisfy this criteria and can be added to the watch list. One or more other rules can be defined for this criteria. The computer system can access and use timestamps, tags, and activity occurrence counts from the received user information to determine whether the user satisfies the frequency of user activity (308) criteria. In some implementations, the computer system may also receive an event log that is associated with the user, serve up the event log, and then assess the event log to determine frequency of user activity and type of user activity. Serving up the event log can be beneficial to efficiently use compute resources and processing power.

The user paired with a quantity of event alerts that exceeds a threshold quantity of pairings (310) criteria may also be defined in rules to determine whether the user performed a particular type of activity more than a predetermined number of times. The type of activity can be defined in the enterprise, for example by a security analyst, as an activity that may be or is indicative of an insider threat. The threshold quantity can be defined as a number of occurrences of the particular type of activity that may raise suspicion that the associated user poses an insider threat. The threshold quantity can be determined using a historic lookback feature to assess what quantities of a particular type of activity often were associated with insider threats, other suspicious activity or attacks, and/or not considered normalized or expected behavior for one or more groups of users.

The threshold quantity can be the same for assessing the particular type of activity across all users. In some implementations, the threshold quantity can be dynamically adjusted based on the particular user and/or a group of users. As an example, a particular user who has been warned several times in the past that their activity was suspicious (such as the particular type of activity) can have a lower threshold quantity than a new user in the enterprise who has not yet been associated/paired with network activities (or the particular type of activity, for example). Therefore, it may take fewer instances of the particular user performing the same suspicious activity again than the new user performing the suspicious activity to add the particular user to the watch list. The particular user may only have to perform the same suspicious activity two more times to be added to the watch list while the new user may have to perform the suspicious activity five or more times before being added to the watch list.

As another example, a group of software developers can have a higher threshold quantity than a group of executives because the group of executives may have more privileges/entitlements in the enterprise and thus may have access to more sensitive information that can be exploited. Therefore, it may take fewer instances of an executive accessing and/or transmitting sensitive information than a software developer to add the executive to the watch list.

The no casefile associated with the user (312) criteria can be defined in a rule as a Yes/No decision tree. A casefile can be generated for a user that meets a certain level of suspicion as a potential insider threat. The casefile can be generated when a sufficient amount of data (e.g., evidence) is collected or attributed to the particular user. The casefile can maintain data about the user that demonstrates why that user may be or is an insider threat to the enterprise. The watch list can be used for monitoring users who do not have casefiles. Therefore, users can be added to the watch list if they appear suspicious but may not yet have enough attributed data to generate a casefile. The user can remain on the watch list until it is determined, by the computer system and/or a security analyst, that enough data is attributed to the user to generate a casefile and thus identify the user as a potential insider threat.

Sometimes, the user may not be associated with a casefile because the user does not pose a threat to the enterprise. For example, the user may not be associated/paired with suspicious activity/events. Other times, as mentioned above, the user may not be associated with a casefile because the user is not paired with enough activities/events to warrant identifying the user as a potential insider threat. Therefore, this criteria can be coupled with one or more other criterion to identify whether there is no casefile because the user is in fact not a threat or the user is paired with suspicious activity/events but not enough to raise suspicions about the user. For example, if the user accessed a particular website (type of user activity 306 criteria) more than 4 times over 5 days (frequency of user activity 308 criteria) and the user is not associated with a casefile (312), then the user can be added to the watch list. This user is routinely performing a suspicious activity, thereby increasing the amount of data collected about the user's suspicious activities and increasing the belief that the user poses an insider threat. This user should be added to the watch list to validate/confirm this belief. Once the belief is validated/confirmed, the user can be removed from the watch list and a casefile can be generated for the user.

The computer system can identify whether the received user information (302) includes a tag, unique identifier, or other association with a casefile. If there is no such association with a casefile, the computer system can determine that the user is not associated with a casefile.

The accessing of a potentially risky website over a predetermined period of time (314) criteria can be defined in a rule(s), similarly to the criteria 306, 308, and/or 310. The computer system can perform a historic lookback analysis to determine what websites, webpages, or other web resources have been accessed in the past and have compromised security of the enterprise. Those websites can be used to define this criteria. The computer system can also identify websites or other web resources that are known for being malicious, threatening, or otherwise suspicious to an enterprise. In some implementations, a rule can simply require the user accessing any of those websites once to then be added to the watch list. In some implementations, a rule can require the user accessing any of those websites at least 3 times or some other predetermined quantity of times to be added to the watch list. Another rule can require the user accessing any of those websites at least 3 times over a past week to be added to the watch list. Yet another rule can require the user accessing any of those websites any number of times over a past 2 weeks to be added to the watch list. Another rule can require the user accessing a first website at least some predetermined quantity of times, a second website at least a predetermined quantity of times over a threshold period of time, and/or a third website over a threshold period of time to then be added to the watch list. One or more other rules can be defined.

The computer system can identify websites the user accessed and frequency of those visits based on assessing the received user information (302). The computer system can also retrieve and serve up an event log associated with the user to glean information about the user's activity in the enterprise network. Thus, the computer system can more efficiently use compute resources and processing power. The computer system can identify, from the event log, what activity the user performed, what website(s) the user visited, how often the user visited the website(s), and/or when (e.g., timestamps) the user visited the website(s). The computer system can use this information to determine whether the user satisfied the criteria 314 to then be added to the watch list.

The triggering rule(s) associated with only authorized users (316) criteria can be defined in rules, similarly to the abovementioned criterion. If the user performs activity that triggers a rule or rules for authorized users, then the user can be added to the watch list—the user may be suspicious of attempting to get around walls in the enterprise. As an example, the user can be a software developer with no access rights to proprietary information. Regardless, the user can try logging into an account that would give them access to proprietary information. This activity can be logged in an event log and attributed (e.g., associated) back to the user (e.g., by an IP address or other unique identifier). This activity may also trigger a rule that checks whether the user trying to log into the account has access privileges. Since this user does not have access privileges and nevertheless tried logging into the account, the user may be suspicious of an insider threat and thus can be added to the watch list.

The computer system can access and serve up an event log that is associated with the user, as described above. Thus, the computer system can more efficiently use compute resources and processing power to identify the type of activity performed by the user, access rights or other privileges of the user, what rules were triggered by the user's activity, and whether the user's access rights or other privileges match the requirements of the rules. Based on this information, the computer system can determine whether the user triggered rules associated with only authorized users (316) and thus should be added to the watch list.

The accessing unauthorized information (318) criteria can also be defined in rules, like the abovementioned criterion. A user who accesses proprietary or otherwise sensitive information may be suspicious of an insider threat and can be added to the watch list. This criteria can be similar to the criteria 316, except here, the user may not have to trigger one or more rules associated with access privileges in order to be added to the watch list. Instead, the user must simply access the proprietary or otherwise sensitive information to be added to the watch list. The unauthorized information can be defined differently for, and based on, each enterprise. One enterprise may consider a particular type of information as unauthorized (e.g., proprietary, sensitive, etc.) while another enterprise may consider the same type of information as authorized (e.g., nonproprietary, generic, public, etc.). One or more of the rules may also define a way in which the unauthorized information is accessed (e.g., access points) as criteria for being added to the watch list (e.g., logging into an account with an authorized user's credentials, accessing the information from an authorized user's device, receiving the information from another user or account, etc.). One or more of the rules may also define a way in which the unauthorized information is used as criteria for being added to the watch list (e.g., emailing the information by a private email account, saving the information to an external hard drive/USB, etc.). As described above, the computer system can retrieve and serve up an event log associated with the user to determine whether the user satisfies the criteria 318.

The one or more user risk score(s) exceed threshold score(s) (320) criteria can be defined in one or more rules. A user who is considered a higher risk relative to other users in a same group, role, and/or performing similar activities can be suspicious of an insider threat and thus added to the watch list for monitoring. If the user has a role-based risk score that exceeds some threshold score, then the user can be added to the watch list. Similarly, if the user has an event-based risk score that exceeds some threshold score (where the role-based and event-based threshold scores can be different or the same), then the user can be added to the watch list. If the user has a composite risk score that exceeds some threshold score, then the user can be added to the watch list. As another example, if any of the user's risk scores deviate from normalized or expected behavior of a group that the user is part of by more than a predetermined threshold amount, the user can be added to the watch list.

The computer system can analyze the received user information (302) to identify any one of the user's role-based, event-based, and/or composite risk scores. The computer system can then compare the score(s) to the threshold score(s) to determine whether the criteria 320 is satisfied. In some implementations, the threshold score(s) can be dynamically determined based on dynamic changes/updates to groupings, normalized behavior of groups, and/or user event-based and/or composite risk scores. In some implementations, the threshold score(s) can vary based on the user, group of users, role of the user, events associated with the user, etc. The threshold score(s) can also vary from enterprise to enterprise.

The false positive rate exceeding a threshold rate (321) criteria can be defined in one or more rules, as described above. False positives can be treated as potential risks or threats to the enterprise. If there are enough false positives associated with the user (e.g., the false positive rate exceeds the predetermined threshold rate), then the user can be added to the watch list. The computer system can identify a false positive rate for the user by retrieving and serving up an event log associated with the user. If the user keeps engaging in activity that would constitute violations of one or more rules and/or would be considered security threats to the enterprise, then the user may be pushing their limits and thus should be added to the watch list. The false positive rate can be determined based on one or more factors, such as the user's role, responsibilities, activity type, frequency of activity, group association, deviation from normalized behavior of an associated group, role-based risk score, event-based risk score, and/or composite risk score.

The computer system can add the users that were identified for satisfying one or more of the criteria (304-321) to the watch list in 322. The watch list can be updated in 311 at any frequency, time intervals, or as a result of a triggering event. The triggering event can include, but is not limited to, a detection alert, job change of a user, entitlement change of a user, and/or a job performance indicator associated with a user. Whenever the watch list is updated, it can also include an indication that reflects time criteria so that the watch list can capture what occurred before as well as after adding the user(s) to the watch list (or adding the user(s) to a particular group identification). The watch list can include all users that have been identified as potentially suspicious of insider threats to the enterprise. As described throughout, users may also be added to more than one watch list. Each watch list can be used for monitoring different types of users, different types of activity, and/or other security-related factors. Each watch list may also address a different type of risk, a different risk based on severity, a different risk based on complexity, and/or a different risk based on other criteria defined for the particular enterprise.

In 324, the computer system can rank the users in the watch list. The users can be ranked based on their composite risk scores. The users can also be ranked based on their role-based and/or event-based risk scores. The users can be ranked from riskiest to least risky. Thus, the users can be ranked from highest risk score to lowest risk score. The users may also be ranked using one or more other criteria. For example, users can be ranked based on timing of their associated activity. The more recent the associated activity, the higher up in the watch list the user can be ranked. After all, the user may be considered more of a present/current threat in comparison to a user who engaged in suspicious activity over a week ago or after some predetermined period of time.

As another example, the users can be ranked based on type of activity that they are associated with. For example, activity that is considered most threatening and/or riskiest can be ranked higher in the watch list than more benign activity. The users can also be ranked based on their role in the enterprise. Users having more privileges, access rights, and/or entitlements can be ranked higher in the watch list than other users. In some implementations, the users can also be ranked based on how much data (e.g., evidence, network activity) is already collected and associated with them. The more data associated with the user, the higher they can be ranked in the watch list. Security analysts can then focus their review on the highest ranked users so that if enough data is collected about those users, those users can be removed from the watch list and casefiles can be generated for them.

One or more other criteria can also be used to rank the users in the watch list. One or more combinations of criteria can further be used to rank the users in the watch list. Moreover, when the watch list is outputted to a relevant user, such as a security analyst, at a user device, the relevant user can sort/filter the contents of the watch list. Therefore, the relevant user can view the users in the watch list in one or more different rankings that are preferred/desired by the relevant user.

The computer system can also generate a watch list report (e.g., daily report(s)) in 326. The computer system can generate the report or reports at one or more different times, such as once a day, two times a day, once every three days, etc. The computer system can generate a daily report, which can capture changes to the watch list and/or changes in behavior/activity of users in the watch list and/or users removed from the watch list. In some implementations, the daily report can capture information about different groups of users, normalized behavior for those groups, and/or changes to users in the groups, scores of users in the groups, etc. The daily report can also include information about one or more users. For example, the daily report can indicate changes in behavior of a particular user over some predetermined period of time. The report can, for example, indicate how and when the user moved from one form of exfiltration to another form of exfiltration when they received a warning or other notification to stop exfiltration of data. The daily reports can be used by a relevant user, such as a security analyst, to more accurately perform their role in identifying, mitigating, and/or preventing potential security threats in the enterprise.

The computer system can output the watch list and/or report in 328. As described herein, the computer system can transmit the watch list and/or report to a user device, such as the user device 104, to be presented in a GUI to a relevant user, such as a security analyst. In some implementations, the watch list may be outputted. The relevant user can then select one or more options to generate reports about content in the watch list (or one or more other users and/or groups of users). The relevant user's selection can be transmitted as instructions to the computer system, which can generate the requested report and return the report to the user device to be outputted and presented to the relevant user. The computer system can also provide a dashboard of information to the relevant user at the user device. The dashboard can allow the relevant user to sort through and view a variety of information about users, groups of users, the watch list, and/or casefiles.

In some implementations, the security analyst can select options to view additional/more information about one or more users on the watch list. When the security analyst selects a user from the watch list, instructions can be sent from the user device to the computer system requesting the computer system to retrieve and serve up an event log associated with the selected user. This process can more efficiently use compute resources and processing power instead of loading, storing, and/or providing event logs for all users in the watch list.

Figure 4:
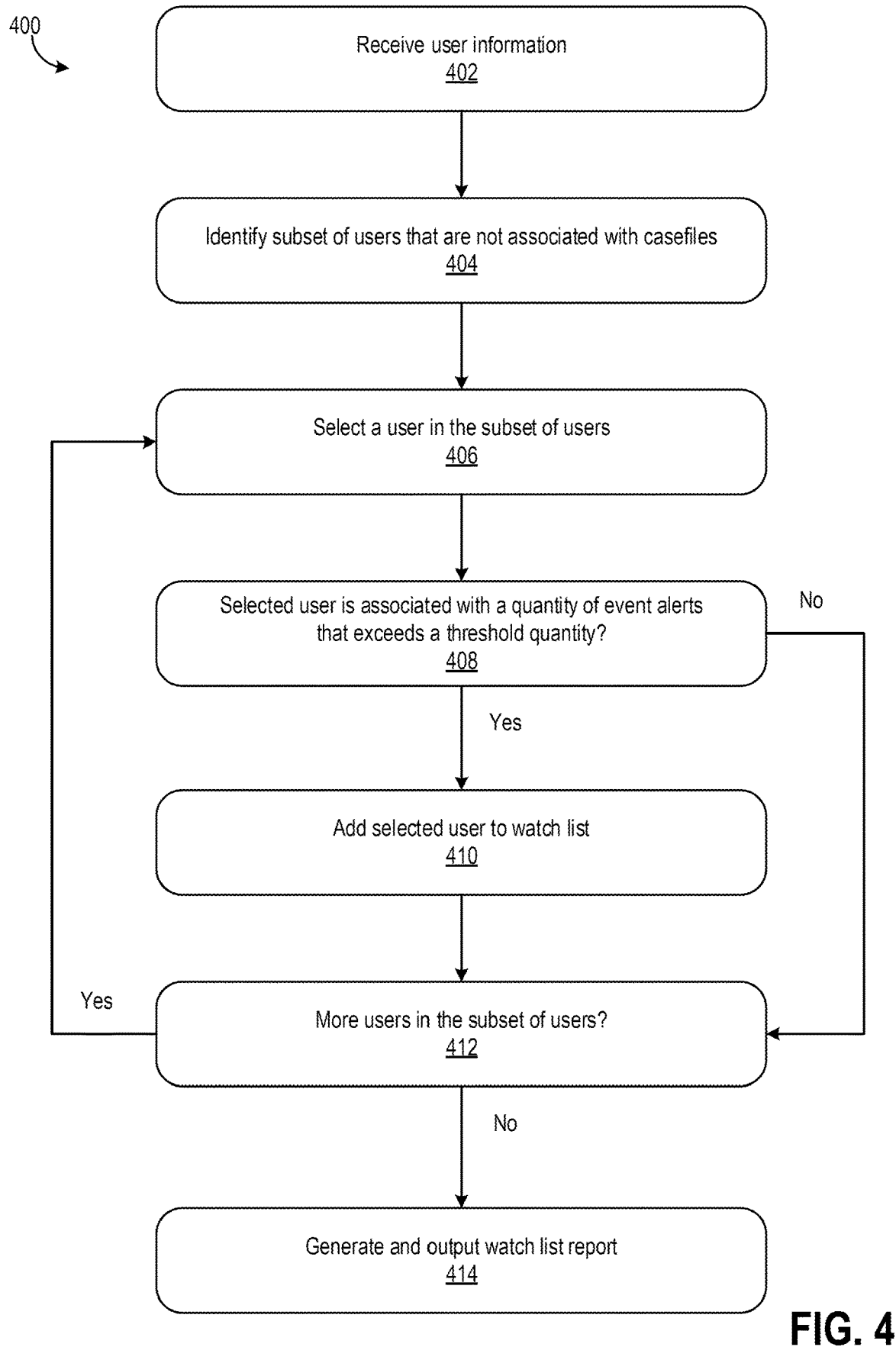
FIG. 4 is a flowchart of another example process for adding users to a watch list.

FIG. 4 is a flowchart of another example process 400 for adding users to a watch list. The process 400 can be performed to identify users that are not associated with casefiles but are riskier to the enterprise than other users who are not associated with casefiles. If a user has a casefile, for example, they may not be added to the watch list.

The process 400 can be performed by the computer system 102. The process 400 can also be performed by one or more other computing systems, devices, computers, networks, cloud-based systems, and/or cloud-based services. For illustrative purposes, the process 400 is described from the perspective of a computer system.

Referring to the process 400 in FIG. 4, the computer system can receive user information in 402. Refer to blocks 202 in the process 200 (refer to FIGS. 2A-B) and 302 in the process 300 (refer to FIGS. 3A-B) for further discussion about receiving the user information.

In 404, the computer system can identify a subset of users that are not associated with casefiles. For example, the user information can include an indication of whether the user is associated with a casefile. The indication can be a tag, casefile identifier, or other piece of information/data that associates the particular user with a particular casefile. If the user information does not contain such an indication, then the user is not associated with a casefile. If, on the other hand, the user information does include the indication, then the user is associated with a casefile. Users that do not have the indication can be identified in the subset of users.

The computer system can select a user in the subset of users (406). Next, the computer system can determine whether the selected user is associated with a quantity of event alerts that exceed a threshold quantity (408). The computer system, and/or a security analyst or other relevant user, can define one or more types of event alerts that may be used in block 408. Thus, only some types of event alerts may trigger the decision of whether to add a user to the watch list. As an illustrative example, although a user may be in the subset of users because the user does not have a casefile, the user's associated activity may not correspond to one of the identified types of event alerts. The user may download content from an unauthorized website but the type of event alert that is triggered in 408 can be accessing and transmitting proprietary information using a personal email. Therefore, the user may not satisfy the rule in 408 and thus may not be added to the watch list. As another example, if the user does not have a casefile and accesses and transmits proprietary information via personal email more than a threshold quantity of times over a predetermined period of time, then the user satisfies the rule in 408 and can be added to the watch list.

The computer system can also use one or more other criteria to determine whether the selected user should be added to the watch list. For example, refer to the criteria 306-321 in the process 300 (refer to FIGS. 3A-B) for discussion about other criteria that can be used herein.

If the user is not associated with a quantity of event alerts that exceeds the threshold quantity, the computer system can proceed to block 412, described below. If, on the other hand, the user is associated with a quantity of event alerts that exceeds the threshold quantity, the computer system can add the selected user to the watch list in 410. Thus, the user may engage in a sufficient amount of a particular type of suspicious activity that warrants additional monitoring. Once the user is added to the watch list, the user can be monitored by the security analyst to determine whether a sufficient amount of data exists to remove the user from the watch list and generate a casefile for the user.

After adding the user to the watch list, the computer system can proceed to block 412. In 412, the computer system can determine whether there are more users in the subset of users that do not have casefiles. If there are more users, the computer system can return to block 406 and repeat 408-410 for each of the remaining users to determine whether any of the remaining users should also be added to the watch list. If there are no more users, the computer system can generate and output a watch list report in 414. Refer to FIG. 1, block 234 in the process 200 in FIGS. 2A-B, and blocks 326-328 in the process 300 in FIGS. 3A-B for further discussion about generating and outputting the watch list and/or the watch list report.

Figure 5A:
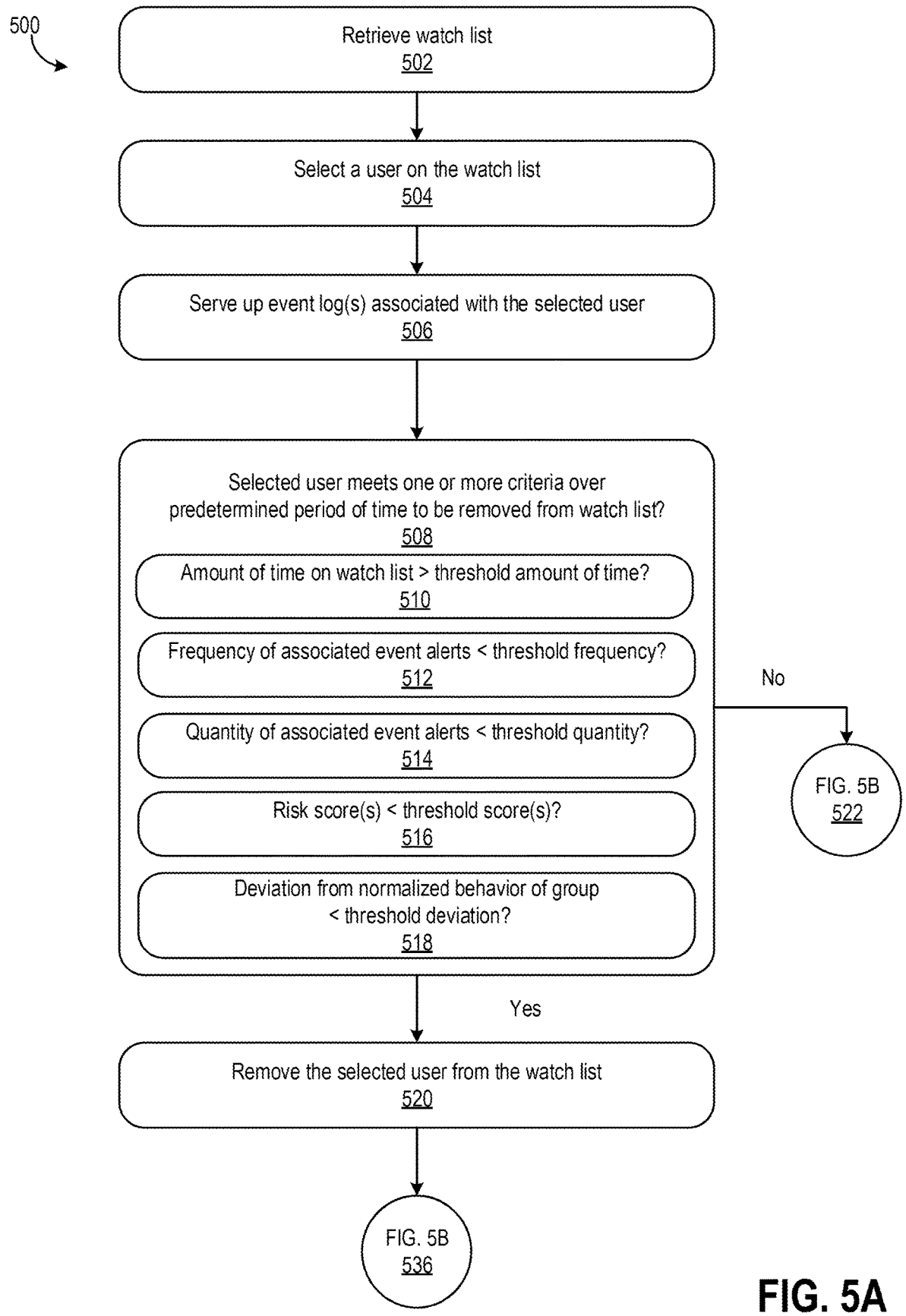
FIGS. 5A-B is a flowchart of a process for removing users from a watch list.
Figure 5B:
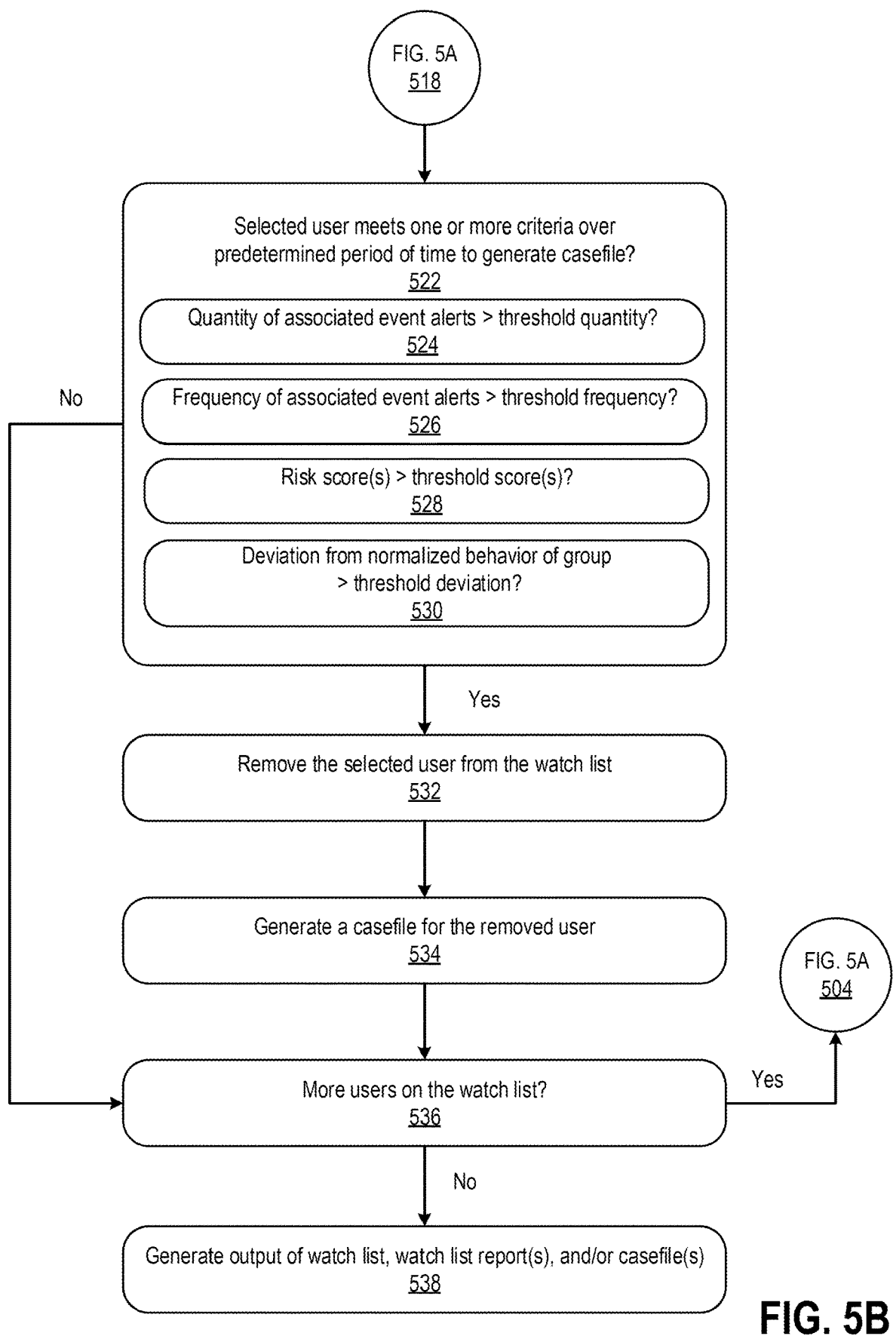

FIGS. 5A-B is a flowchart of a process 500 for removing users from a watch list. As mentioned, the watch list can be used to monitor users that may pose insider threats to the enterprise but do not yet have casefiles. Users can be removed from the watch list in one or more scenarios. For example, a user can be removed from the watch list if the user has been on the watch list for more than a predetermined amount of time and/or the user has changed their behavior. In other words, the user may no longer be associated with event alerts and/or the user may be associated with a quantity of event alerts that is less than a predetermined threshold quantity over a predetermined period of time. As another example, a user can be removed from the watch list if enough data is associated with the user to warrant generating a casefile for that user.

The process 500 can be performed at predetermined times. For example, the process 500 can be performed once a day, every 12 hours, every 24 hours, every 72 hours, etc. The process 500 can also be performed when a change is made to the watch list, such as a user being added to the watch list and/or information about the user, such as their ranking, changing. In some implementations, the process 500 can be performed whenever the computer system polls a data store for updates to the watch list. If updates have been made to the watch list, then the process 500 can be performed.

The process 500 can be performed by the computer system 102. The process 500 can also be performed by one or more other computing systems, devices, computers, networks, cloud-based systems, and/or cloud-based services. For illustrative purposes, the process 500 is described from the perspective of a computer system.

Referring to the process 500 in both FIGS. 5A-B, the computer system can retrieve a watch list in 502. The watch list can be stored in a data store, such as the data store 106. The watch list can include identifiers (e.g., IP addresses or other unique identifiers) that objectively identify users in the enterprise. The computer system can use those identifiers to retrieve event logs associated with the users on the watch list. The computer system can select a user on the watch list in 504. The computer system can randomly select the user. The computer system may also select the user at the top of the watch list and work the way down the watch list until all the users have been selected and analyzed in the process 500. In some implementations, the computer system can work backwards and select the user at the bottom of the watch list (the least risk user) and then work up the watch list until all of the users have been selected and analyzed.

In 506, the computer system can serve up event log(s) associated with the selected user. As mentioned above, the watch list can include an identifier for each of the users listed thereon. The computer system can use the identifier of the selected user as a pointer to an associated event log or logs. The computer system can request from another computer system, such as the event-based monitoring system 803 described in FIGS. 8A-C, the event log(s) by providing the other computer system with the user's identifier. In some implementations, the computer system can retrieve the event log(s) for the user from the data store by using the identifier from the watch list. As described throughout this disclosure, retrieving and serving up the event log(s) for the selected user can be more efficient in terms of using compute resources and processing power than processing event logs, storing the processed event logs, and retrieving the processed event logs at a later time. The disclosed techniques can therefore provide for faster retrieval and analysis of the event logs during runtime to therefore provide accurate and fast determinations about the selected user.

The computer system can determine whether the selected user meets one or more criteria over a predetermined period of time to then be removed from the watch list (508). If one or more of the criteria is met, then the computer system can proceed to block 520. If one or more of the criteria is not met, the computer system can proceed to block 522. One or more of the criteria can be combined to determine whether to remove the selected user from the watch list. Moreover, the criterion described herein are non-exhaustive. One or more other criterion can be used and based on characteristics of the enterprise to determine whether the user should be removed from the watch list. Block 508 can be performed to determine whether the user should be removed from the watch list because they simply do not pose an insider threat to the enterprise. Users may be added to the watch list because at that time, they may pose a threat to the enterprise. Over time, as those users continue to be monitored on the watch list, they may no longer pose a threat to the enterprise and thus can be removed from the watch list. For example, the user can be added to the watch list after a first occurrence of suspicious activity, but the user may not continue to engage in such activity. The user might have engaged in a onetime incident and therefore does not pose a serious threat to the security of the enterprise. The user can be removed from the watch list at the present time. The predetermined period of time can be any amount of time that is dynamically determined by the computer system (for example, based on a historic lookback analysis of activity and threats in the enterprise) and/or by a relevant user, such as a security analyst. The predetermined period of time can be, for example, a past 24 hours, a past 48 hours, a past 72 hours, a past week, a past month, etc. One or more other predetermined periods of time can be used in the process 500.

An example criteria can include determining whether an amount of time on the watch list exceeds a threshold amount of time (510). In other words, a user may be on the watch list for so long that their activity is stale and no longer a present or future threat to the enterprise. The threshold amount of time can be determined dynamically by the computer system (for example, based on how long a user typically stays on the watch list before being removed) and/or by a relevant user in the enterprise, such as a security analyst. The threshold amount of time may also vary depending on the type of activity the user is associated with, frequency of the user's activity, quantity of the user's activity, and one or more other factors. The threshold amount of time can be 24 hours, 2 days, 3 days, 4 days, 5 days, 6 days, 7 days, etc. One or more other threshold amounts of time can be used in 510. Thus, if the selected user is on the watch list for more than the threshold amount of time, the user may not pose a present threat to the enterprise and the user can be removed from the watch list (520). If the selected user has not been on the watch list for more than the threshold amount of time, the user can remain on the watch list and the computer system can proceed to block 522.

Another criteria can include determining whether frequency of associated event alerts is less than a threshold frequency (512). If the frequency of associations that are made for the user decrease over the predetermined period of time, the user may no longer be considered a present threat to the enterprise. The user may have engaged in a significant amount of suspicious activity in the beginning of the predetermined period of time (which resulted in the user being added to the watch list) but towards the end of the predetermined period of time, the user might have engaged in significantly less or no suspicious activity (thus frequency of associations with event alerts has decreased). The user therefore may not pose a present threat to the enterprise and thus can be removed from the watch list (520). If, on the other hand, the frequency of associated event alerts is not less than the threshold frequency, the computer system can proceed to block 522. As described in reference to the threshold amount of time, the threshold frequency can also be determined dynamically by the computer system and/or by the security analysts. The threshold frequency can also vary based on one or more factors, such as the type of event alerts that are associated with the user, the role of the user, and the type of activity the user is associated with.

Another criteria can include determining whether a quantity of associated event alerts is less than a threshold quantity (514). If the user engages in less suspicious activity events during the predetermined period of time than the threshold quantity, regardless of the frequency of the associations, then the user may no longer be a present threat to the enterprise. As an illustrative example, the user can be associated with 10 event alerts 2 weeks ago. In the present week, the user may only be associated with 3 event alerts that are spread out across the predetermined period of time and not clustered at a particular time (which would indicate a high frequency). If the threshold quantity is 4, then the user may be removed from the watch list because during the predetermined period of time, the user only engaged in 3 suspicious activities (520). If, on the other hand, the threshold quantity is 2, for example, the user may remain on the watch list and the computer system can proceed to block 522. As described in reference to the threshold amount of time, the threshold quantity can also be determined dynamically by the computer system and/or by the security analysts. The threshold quantity can also vary based on one or more factors, such as the type of event alerts that are associated with the user, the role of the user, and the type of activity the user is associated with.

Yet another criteria can include determining whether one or more risk scores of the user are less than one or more threshold scores (516). If the user's role-based, event-based, and/or composite risk score decreased below the one or more corresponding threshold scores during the predetermined period of time, then the user may no longer be as risky to the enterprise and thus can be removed from the watch list (520). If any one or more of the user's risk scores have not changed or increased during the predetermined period of time, then the user can remain on the watch list and the computer system can proceed to block 522. As described in reference to the threshold amount of time, the threshold score(s) can also be determined dynamically by the computer system and/or by the security analysts. The threshold score(s) can also vary based on one or more factors, such as the type of event alerts that are associated with the user, the role of the user, the type of activity the user is associated with, and/or the group(s) that the user is part of.

Another criteria can include determining whether a deviation from normalized behavior of a group that the user is associated with is less than a threshold deviation (518). If, during the predetermined period of time, the user deviated less from the normalized behavior of the group relative to other users in the group or relative to the user's deviation before the predetermined period of time, then the user may no longer be as risk to the enterprise. Thus, the user can be removed from the watch list in block 520. If, on the other hand, the user maintains the same deviation from the normalized behavior of the group as before the predetermined period of time or the user's deviation exceeds the threshold deviation during the predetermined period of time (e.g., other members in the group improve their activities, thus shifting the normalized behavior, or the user engages in additional suspicious behavior), then the user can remain on the watch list and the computer system can proceed to block 522. As described in reference to the threshold amount of time, the threshold deviation can also be determined dynamically by the computer system and/or by the security analysts. The threshold deviation can also vary based on one or more factors, such as the type of event alerts that are associated with the user, the role of the user, the type of activity the user is associated with, the normalized behavior of the group, activities of other users in the group relative to the selected user, risk scores of other users in the group relative to the selected user, and/or roles of other users in the group relative to the selected user.

If any one or more of the criterion in blocks 508-518 are met, then the computer system can remove the selected user from the watch list in 520. Thus, the selected user may no longer be as risky or pose an internal threat to the enterprise at the present time. The user might have been involved in a onetime security incident or had accidentally engaged in an activity that appeared suspicious. Removing this user from the watch list can be beneficial to reduce an amount of users on the watch list that need to be monitored. Thus, the security analysts can focus their efforts, attention, and resources on analyzing and monitoring users that may be riskier or pose internal threats to the enterprise at the present time. The computer system can then proceed to 536, which is discussed further below.

If any one or more of the criterion in blocks 508-518 are not met, then the computer system can proceed to block 522. In other words, the selected user may still be risky or may potentially pose an internal threat at the present time. Subsequent analysis of the event log(s) associated with the user (in block 522) can dictate whether to escalate to casefile generation or whether to maintain the user on the watch list until more data (e.g., evidence) is collected about the user to identify them as a real threat.

In 522, the computer system can determine whether the selected user meets one or more criteria over a predetermined period of time to generate a casefile for that user. If the user meets one or more of the criteria, then there is a sufficient amount of data (e.g., evidence) about the user to warrant identifying the user as a potential insider threat to the enterprise. Since there is sufficient enough data, the user no longer needs to be monitored on the watch list and can thus be removed (532). The casefile can be generated for that user with the data (534). The predetermined period of time can be the same as the predetermined period of time in blocks 508-518. In some implementations, the predetermined period of time can be different in 522-530. One or more of the criteria can be combined to determine whether to remove the selected user from the watch list and generate a casefile for the selected user. Moreover, the criterion described herein are non-exhaustive. One or more other criteria can be used based on the enterprise to determine whether the user should be removed from the watch list to generate a casefile for that user.

An example criteria can include determining whether a quantity of associated event alerts exceeds a threshold quantity (524). Similar to block 514, if the quantity of event alerts that the user is associated with during the predetermined period of time exceeds the threshold quantity, the user may be risky enough to remove from the watch list (532) and generate a casefile (534). In other words, the user may be engaging in more activity that is suspicious or otherwise threatening to the enterprise. Enough event alerts have been associated with the user to identify the user as very risky and to generate a casefile for the user. On the other hand, if the quantity of event alerts does not exceed the threshold quantity, the user can remain on the watch list and can continue to be monitored. The threshold quantity can be dynamically determined by the computer system and/or the security analysts, as described herein. The threshold quantity can also vary depending on one or more factors described above in reference to block 514. The threshold quantity in block 524 can be the same as the threshold quantity in block 514. In some implementations, the threshold quantity in block 524 can be different (e.g., higher) than the threshold quantity in block 514.

Another criteria can include determining whether a frequency of associated event alerts exceeds a threshold frequency (526). Similar to block 512, if the frequency of event alerts that the user is associated with during the predetermined period of time exceeds the threshold frequency, the user can be very risky to the enterprise and thus can be removed from the watch list (532) so that a casefile can be generated for that user (534). The user may be engaging more frequently in suspicious activity during the predetermined period of time. Enough event alerts in a short timeframe within the predetermined period of time can be attributed to the user, thereby making the user more risky and a bigger insider threat. On the other hand, if the frequency of event alerts associated with the user does not exceed the threshold frequency (e.g., the frequency remains constant during the predetermined period of time), the user can remain on the watch list and can continue to be monitored. The threshold frequency can be dynamically determined by the computer system and/or the security analysts, as described herein. The threshold frequency can also vary depending on one or more factors described above in reference to block 512. The threshold frequency in block 526 can be the same as the threshold quantity in block 512. In some implementations, the threshold quantity in block 526 can be different (e.g., higher) than the threshold quantity in block 512.

Yet another criteria can include determining whether one or more risk scores of the user exceed one or more threshold scores (528). Similar to block 516, if any one or more of the user's role-based, event-based, and/or composite risk scores exceeds the corresponding threshold score(s) during the predetermined period of time, the user can be very risky to the enterprise and thus can be removed from the watch list (532) so that a casefile can be generated for that user (534). The user may be associated with significantly more suspicious activity (in comparison to the associations before the predetermined period of time, relative to peers of the user, and/or relative to users in a same group as the user) during the predetermined period of time, thereby making the user more risky and a bigger insider threat. On the other hand, if any of the user's risk scores remain constant or are less than the threshold score(s) during the predetermined period of time, the user can remain on the watch list and can continue to be monitored. The threshold score(s) can be dynamically determined by the computer system and/or the security analysts, as described herein. The threshold score(s) can also vary depending on one or more factors described above in reference to block 516. The threshold score(s) in block 528 can be the same as the threshold quantity in block 516. In some implementations, the threshold score(s) in block 528 can be different (e.g., higher) than the threshold quantity in block 516.

Another criteria can include determining whether a deviation from normalized behavior of a group that the user is associated with exceeds a threshold deviation (530). Similar to block 518, if the user's deviation from the normalized behavior of the group exceeds the threshold deviation during the predetermined period of time, the user can be very risky to the enterprise and thus can be removed from the watch list (532) so that a casefile can be generated for that user (534). During the predetermined period of time, the user may be deviating even more from the normalized behavior and/or the other users in the group may have improved their activities, thereby shifting the line for normalized behavior back (which makes the user have a greater deviation from the normalized behavior unless the user also improves their activities during the predetermined period of time). Thus, the user is now more risky and a bigger insider threat. On the other hand, if the user's deviation from the normalized behavior of the group does not exceed the threshold deviation, the user can remain on the watch list and can continue to be monitored. The threshold deviation can be dynamically determined by the computer system and/or the security analysts, as described herein. The threshold deviation can also vary depending on one or more factors described above in reference to block 518. The threshold deviation in block 530 can be the same as the threshold quantity in block 518. In some implementations, the threshold quantity in block 530 can be different (e.g., higher) than the threshold quantity in block 518.

If the selected user does not meet any one or more of the criteria described in blocks 522-530, the computer system can proceed to block 536, described further below. In other words, not enough data has been collected about the selected user to identify them as risky enough to generate a casefile. The user can thus remain on the watch list and continue to be monitored.

If the selected user does meet any one or more of the criteria, the computer system can proceed to block 532. Enough data has been collected about the selected user to identify them as risky enough to the enterprise to generate a casefile. Since enough data has been collected about the user while the user was monitored on the watch list to warrant identifying the user as very risky to the enterprise, the user can be removed from the watch list and a casefile can be generated for the user.

Accordingly, in 532, the computer system can remove the selected user from the watch list. The computer system can then generate a casefile for the removed user (534). The casefile can include a link or other association to the event log(s) of the user. The casefile can also include information about the particular user, which can be used by the security analysts to determine how to respond to threats posed by the user. This information can include but is not limited to a unique identifier for the user, prior/past behavior/activity that has been associated with the user, tags identifying types of event alerts that the user was associated with in the past (or over a predetermined period of time), the user's role, the user's responsibilities, privileges, and/or entitlements, one or more groups that the user is associated with, one or more historic and/or present risk scores (e.g., role-based, event-based, and/or composite), the user's region, the user's department, the user's ranking in one or more groups, and/or the user's ranking in the watch list. Additional, fewer, or different information can also be included in the casefile for the user.

The casefile can be used by the security analysts to determine one or more actions to take in response to the risks or threats posed by the associated user. For example, the security analysts can review the casefile and determine that the best mitigation or prevention technique is to contact HR to speak with the user. As another example, the security analysts can determine that the best mitigation or prevention technique is to remove some privileges from the user, reassign the user to a different team, department, region, office, etc., or perform some other action.

Once the casefile is generated, the computer system can proceed to block 536.

In 536, the computer system can determine whether there are more users to assess on the watch list. If there are more users, the computer system can return to block 504 and repeat blocks 506-534 for each of the remaining users on the watch list.

If there are no more users on the watch list (536), the computer system can generate output of the watch list, watch list report(s), and/or casefile(s) (538). Refer to FIG. 1, block 234 in the process 200 in FIGS. 2A-B, blocks 326-328 in the process 300 in FIGS. 3A-B, and/or block 414 in the process 400 in FIG. 4 for further discussion about generating and outputting information to relevant users, such as security analysts. The output can include a dashboard presented in a GUI display at the user device of the relevant user(s). The dashboard can provide functionality (e.g., selectable options) for the relevant user to view one or more casefiles, the watch list, and/or one or more reports (such as the daily reports described herein).

The computer system can regenerate or otherwise update the outputted watch list so that it no longer includes the users that were removed therefrom. The computer system may also regenerate the rankings of users in the watch list to reflect removal of one or more users from the watch list. The watch list reports, such as the daily report, can also be generated to reflect changes made to the watch list. For example, the watch list reports can indicate which users were removed from the watch list for no longer being risky to the enterprise, which users were removed from the watch list to generate casefiles, and which users changed in ranking in the watch list. One or more other information can be presented in the watch list reports.

FIG. 6 is a system diagram depicting one or more components that can perform the techniques described herein. The computer system 102, user devices 104, network monitoring system 105, and data store 106 can communicate (e.g., wireless and/or wired) via the network(s) 108.

The computer system 102 can include processor(s) 600, a user risk scoring engine 602, a user grouping engine 604, a watch list generator 606, an output generator 608, a watch list analyzer 609, a casefile generator 610, and a communication interface 611. The processor(s) 600 can execute instructions at the computer system 102 for performing one or more of the techniques described herein.

The user risk scoring engine 602 can be configured to determine one or more of role-based, event-based, and/or composite risk scores for users in the enterprise. The user risk scoring engine 602 can include one or more additional components, such as a role-based monitoring system 801, an event-based monitoring system 803, and a composite user risk scoring system 805. Refer to FIG. 8A for additional discussion about the components 801, 803, and 805. Moreover, refer to blocks 756-758 in the process 750 of FIG. 7B for further discussion about determining the role-based risk scores for the users in the enterprise.

In brief, the user risk scoring engine 602 can identify a role of a user and risks associated with that role. The engine 602 can access user information 620A-N from the data store 106. The user information 620A-N can include a role of the user. The engine 602 can use a lookup table to identify risks associated with the particular role of the user. The engine 602 can then generate a role-based risk score for the particular user based on the risks associated with the user's role. As described in reference to the process 750 in FIG. 7B, the engine 602 can assign a predetermined quantity of points to the user's role-based risk score based on the risks associated with the user's role. The engine 602 can use a lookup table that correlates risks of different roles with quantities of points to allocate to a role-based risk score. A role with higher or more risks can be correlated with a higher quantity of points than a role with lower or fewer risks. The role-based risk scores that are determined by the engine 602 can be stored in the data store 106 in the user information 620A-N. The role-based risk score can be determined by the role-based monitoring system 801 in FIG. 8A.

The user risk scoring engine 602 can also determine and generate users' event-based risk scores. Refer to blocks 760-762 in the process 750 of FIG. 7B for additional discussion on determining event-based risk scores. In brief, the engine 602 can determine how many points to allocate to a user's event-based risk score based on what activities are associated with the user (e.g., user-event pairings). The engine 602 can increase an existing event-based risk score for a user. The engine 602 can also depreciate an existing event-based risk score for the user. The event-based risk score for the user can dynamically change based on fewer risky event alerts being associated with the user. Thus, the event-based risk score for the user can be dynamically changed based on new case outcomes and/or event data that is detected as described throughout this disclosure. The engine 602 can retrieve associated event alerts from the user information 620A-N in the data store 106. The engine 602 can also retrieve user-event pairings that are temporarily stored/cached in memory at the computer system 102.

The engine 602 can assess the associated event alerts to determine whether to increase or decrease the user's event-based risk score and/or how many points to allocate to the event-based risk score. A higher quantity of associated event alerts and/or increased frequency of associated event alerts during a predetermined period of time can result in more points being allocated to the user's event-based risk score. Conversely, a smaller quantity of event alerts and/or decreased frequency of event alerts during the predetermined period of time can result in fewer points being allocated to the user's event-based risk score. As another example, event alerts that are identified or tagged as higher risk can result in more points being allocated to the user's event-based risk score in comparison to alert events that are identified or tagged as lower risk. Sometimes, the event-based risk scores that are determined by the engine 602 can be temporarily stored/cached at the computer system 102, then retrieved to quickly and efficiently determine composite risk scores for the users. In some implementations, the engine 602 may store the event-based risk scores in the corresponding user information 620A-N in the data store 106. The event-based risk score can be determined by event-based monitoring system 803 described in FIG. 8A.

The user risk scoring engine 602 can also determine a composite risk score of a user. Refer to block 710 in the process 700 of FIG. 7A and block 764 in the process 750 of FIG. 7B for additional discussion about determining the composite risk score of the user. In brief, the engine 602 can retrieve the role-based risk score and/or the event-based risk score for the user from the user information 620A-N in the data store 106. The engine 602 may also, as described herein, retrieve the event-based risk score from temporary storage (e.g., memory) of the computer system 102. The engine 602 can aggregate (e.g., average, sum, other statistical processes) the role-based and event-based risk scores to generate the composite risk score for a particular user. The engine 602 may also update an existing composite risk score when the user's event-based risk score changes (e.g., new user-event pairings are associated with the user during the predetermined period of time). In some implementations, the engine 602 may also determine the composite risk score to be the event-based risk score. The engine 602 can apply a weight to the event-based risk score that is based on or derived from the role-based risk score for the user. The determined composite risk score can be stored in the user information 620A-N in the data store 106. The composite risk score can be determined by the composite user risk scoring system 805 depicted and described in FIG. 8A.

The user grouping engine 604 can be configured to group users based on one or more grouping features. Refer to blocks 204-218 in the process 200 of FIGS. 2A-B for further discussion about grouping users. In brief, the engine 604 can group users based on features that include but are not limited to behavior/activity, role, department, region, role-based risk score, event-based risk score, and/or composite risk score. The engine 604 can retrieve user information 620A-N to determine how to group users in the enterprise. The engine 604 can also access event logs 630A-N to identify activity and/or type of activity associated with users in the enterprise. For example, the event log 630A-N can include a user identifier, which can be an objective identifier such as an IP address, URL, and/or email address. The user identifier can be used by the engine 604 (or other components of the computer system 102) to associate the events recorded in the event log 630A-N with users in the user information 620A-N. Thus, the engine 604 can group users based on behavior/activity.

The engine 604 can generate user groups 622A-N. The user groups 622A-N can be stored in the data store 106. A user group 622A-N can include information that includes but is not limited to group feature(s), normalized behavior, user identifiers, and/or user risk scores. The group feature(s) can be the feature(s) that were used by the engine 604 to create the group. The normalized behavior can be identified by the engine 604 and based on activity of the users that are added to the group. Refer to block 222 in the process 200 of FIGS. 2A-B for additional discussion on identifying the normalized behavior of the group. The user identifiers can be the same as the user identifiers in the event logs 630A-N and/or the user information 620A-N. The user identifiers can be used to associate the users with the groups 622A-N.

The user risk scores can include any one or more of the role-based, event-based, and/or composite risk scores of the users that are part of the groups 622A-N. As described in blocks 224-226 in the process 200 of FIGS. 2A-B, the composite risk scores can be generated for the users, by the user risk scoring engine 602, and stored in the user groups 622A-N in the data store 106. A composite risk score can be based on how much a particular user's behavior/activity deviates from the normalized behavior of the group. The user risk scores in the user groups 622A-N can be the same as any one or more of the role-based, event-based, and/or composite risk scores of the users in the user information 620A-N.

The user grouping engine 604 may also rank users in the user groups 622A-N based on their risk scores and/or how much the users' behavior/activity deviates from the normalized behavior of the group.

The watch list generator 606 can be configured to identify subsets of users from each of the user groups 622A-N that can be added to a watch list. Thus, the generator 606 can automatically add users to the watch list. The watch list generator 606 can retrieve the user groups 622A-N from the data store 106. The watch list generator 606 can also receive the user groups 622A-N from the user grouping engine 604. The generator 606 can then identify users that satisfy one or more criteria to be added to the watch list. The criteria can include but is not limited to association with one or more particular types of risky events/activities, reference from another team member or user in a group or otherwise part of the organization/enterprise, risk level in comparison to other members in the user groups 622A-N, etc. The generator 606 can also be configured to add users to the watch list regardless of whether the users are in the user groups 622A-N. Refer to the blocks 228-230 in the process 200 of FIGS. 2A-B, 304-322 in the process 300 in FIGS. 3A-B, and blocks 408-410 in the process 400 of FIG. 4 for additional discussion on selecting users to add to the watch list.

Once the watch list generator 606 adds users to the watch list, the generator 606 can rank the users. Refer to block 324 in the process 300 of FIGS. 3A-B for additional discussion about ranking. In brief, the users can be ranked from riskiest to least riskiest (e.g., highest risk score to lowest risk score). The users can also be ranked using one or more other criteria, as described throughout this disclosure.

The watch list generator 606 can generate one watch list for the enterprise. The watch list generator 606 can also generate multiple watch lists for the enterprise. The watch lists can be stored in the data store 106 as watch lists 624A-N. A watch list 624A-N can include the criteria that was used to determine which users to add to the watch list 624A-N. The watch list 624A-N may also include the user identifiers that can be used to identify which users are added to the watch list 624A-N. The user identifiers in the watch lists 624A-N can be the same user identifiers that are used and stored elsewhere in the data store 106, thereby making it easy and efficient to make associations between different data types and sources.

The watch list analyzer 609 can be configured to determine when to remove users from the watch list and which users to remove from the watch list. Refer to blocks 508-532 in the process 500 of FIGS. 5A-B for additional discussion about removing users from the watch list. In brief, the analyzer 609 can remove users from the watch list if and when the user(s) meet one or more criteria over a predetermined period of time that indicates the user(s) is no longer a present threat to the enterprise. The analyzer 609 can also remove users from the watch list if a sufficient amount of data (e.g., evidence) is associated with them to warrant casefile generation. In other words, the analyzer 609 can remove the users from the watch list so that casefiles can be generated for those users. To determine whether a user should be removed from the watch list, the analyzer 609 can retrieve the event log 630A-N associated with the user on the watch list (using the user identifier that is in both the watch list 624A-N and the event log 630A-N). The analyzer 609 can serve up the retrieved event log 630A-N to then determine whether the user satisfies any one or more of the criteria described herein to then be removed from the watch list.

The watch list analyzer 609 may also communicate with the network monitoring system 105 to determine whether to remove the user from the watch list. The network monitoring system 105 can, for example, actively monitor network activity associated with users on the watch list. The network monitoring system 105 can detect activity that poses high security risks to the enterprise. The network monitoring system 105 may also send network activity to the watch list analyzer 609 to identify activity that poses high enough security risks to the enterprise to warrant removing the user from the watch list and generating a casefile for that user. When the watch list analyzer 609 removes users, the analyzer 609 may also update the watch list 624A-N in the data store 106. For example, the analyzer 609 can remove the user's user identifier from the watch list 624A-N.

The casefile generator 610 can be configured to generate casefiles for users that have sufficient data (e.g., evidence) to be classified as an insider threat to the enterprise. The generator 610 can generate a casefile for a user that, for example, is added to the watch list 624A-N, monitored, and then removed from the watch list, by the watch list analyzer 609, because sufficient data has been collect to classify the user as very risky to the enterprise. Thus, when the watch list analyzer 609 removes the user from the watch list, the analyzer 609 can transmit a notification (e.g., message) to the casefile generator 610 with the user's unique identifier. The generator 610 can use the identifier to retrieve information about the user from the user information 620A-N and/or the event log 630A-N associated with the user to put together the casefile. Refer to block 534 in the process 500 of FIG. 5B for additional discussion about the casefile.

The casefile generator 610 can then store user casefiles 628A-N in the data store 106. The casefiles 628A-N can include the user identifier, and/or associated event alerts. The casefiles 628A-N can include additional information that may be used by a relevant user, such as a security analyst, to identify one or more actions that can be taken in response to the threat posed by the user of the casefile 628A-N.

The output generator 608 can be configured to generate output to be presented to the relevant users at the user devices 104. Refer to block 234 in the process 200 of FIGS. 2A-B, blocks 326-328 in the process 300 of FIGS. 3A-B, block 414 in the process 400 of FIG. 4, and block 538 in the process 500 of FIGS. 5A-N for additional discussion about generating output. In brief, the generator 608 can generate dashboards that contain information about one or more of the user groups 622A-N, the watch lists 624A-N, and/or the user casefiles 628A-N. The generator 608 can also generate watch list reports 626A-N, which, as described herein, can be daily reports. These reports can indicate changes made to the watch list over a predetermined period of time (e.g., a past 24 hours), including but not limited to users that are added to or removed from the watch list, changes in ranking of the users, changes in user risk scores, changes in user behavior, etc. These reports can provide a more detailed snapshot of the users that are part of the watch lists 624A-N, which can be used by the security analysts at the user devices 104 to make more informed decisions about how to respond to potential and actual insider threats in the enterprise. The output generator 608 can also update one or more information about users, groups, watch lists, and/or casefiles that is presented at the user devices 104 whenever changes to any of the users, groups, watch lists, and/or casefiles occur at the computer system 102. Thus, the output can be updated/modified in real-time.

The user device 104 can be used by a relevant user, such as a security analyst, in the enterprise. The user device 104 can present information to the user about other users in the enterprise. For example, the user device 104 can present composite risk scores of users in the enterprise. The user device 104 can also present other information about the users that can be used by the security analyst to monitor the users and response to potentially threatening activity in the enterprise. Thus, the user device 104 can output any one or more of the user groups 622A-N, the watch lists 624A-N, the watch list reports 626A-N, and/or the user casefiles 628A-N.

The user device 104 can be any type of computing device, including but not limited to a computer, laptop, tablet, cellphone, mobile phone, and/or smartphone. The user device 104 can include a processor(s) 612, input device(s) 614, output device(s) 616, and communication interface 618. The processor(s) 612 can execute instructions that cause the user device 104 to perform one or more of the techniques described herein. The input device(s) 614 can include any type of device that can be used to provide input, by the user, to the user device 104. The input device(s) 614 can include but are not limited to keyboards, microphones, mice, and/or touchscreen displays.

The user can provide input via the input device(s) 614 such as selection of one or more users on a watch list or in a group and/or selection of a group, watch list, watch list report, and/or casefile. The user can also provide input such as selection of one or more operations/actions that can be performed in response to information that is outputted by the user device 104. For example, the user can review the watch list and determine that one or more users on the list should be removed from the list to generate casefiles. Thus, the user can provide input to the user device 104 that indicates the user's desire to remove these users and generate casefiles for them. One or more other operations can be performed to respond to potential insider threats, mitigate and/or prevent such threats.

The output devices(s) 616 can include any type of device that may provide output or otherwise display information to the user at the user device 104. The output device(s) 616 can include but is not limited to touchscreens, other types of display screens, speakers, headphones, and/or other types of devices for presenting information. The output device(s) 616 can display information, in a graphical user interface (GUI) display, such as the user groups, watch list, watch list report, and/or casefiles. The output device(s) 616 can also display selectable options for actions that can be taken in response to information presented at the user device 104, as described above.

The user devices 104 can also be used by users in the enterprise other than security analysts. For example, employees of the enterprise can utilize the user devices 104 to perform their job role functions and responsibilities. Sometimes, the users can also utilize the user devices 104 to engage in activities that are personal or otherwise do not align with the users' job role functions and responsibilities. The user devices 104 can be enterprise-owned devices. The user devices 104 may also be user-owned devices that connect with a network of devices in the enterprise.

Finally, the communication interfaces 611 and 618 can be configured to provide communication between the components described herein.

Figure 7A:
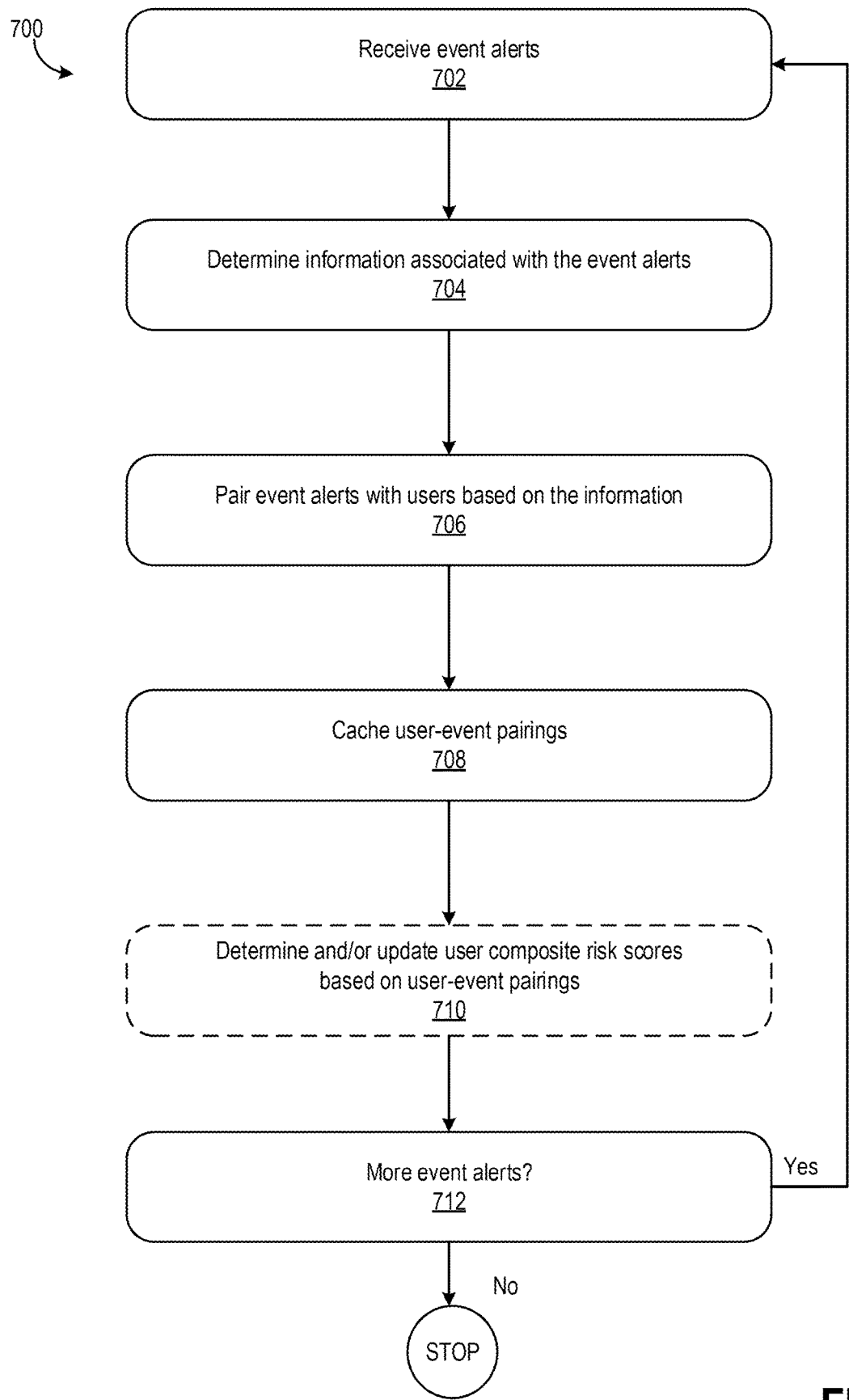
FIG. 7A is a flowchart of a process for pairing event alerts with users.

FIG. 7A is a flowchart of a process 700 for pairing event alerts with users. The process 700 can be performed to associate various network activities with users in the enterprise. Activities can be logged in an event log. The activities can be analyzed by a computer system, such as a security system, to determine whether they trigger and/or satisfy one or more security rules. If the activities trigger and/or satisfy security rules, alerts can be generated in response. Thus, the activities may be flagged for additional inspection and/or review to assess whether such activities in fact pose a security threat to the enterprise. Sometimes, the activities may be benign while other times, the activities can raise suspicion of internal threats to the enterprise and other potential security vulnerabilities. The activity may include accessing certain websites while connected to a network of the enterprise, sending large quantities of information via personal email on the enterprise network, accessing sensitive/internal information, sending sensitive/internal information via personal email on the enterprise network, and other types of activities that may be classified (e.g., by a security analyst or other relevant user) as potential internal security vulnerabilities. In some implementations, the process 700 can be performed at a same time, before, or after process 750 described in FIG. 7B.

The process 700 can be performed by the computer system 102. The process 700 can also be performed by one or more other computing systems, devices, computers, networks, cloud-based systems, and/or cloud-based services. For illustrative purposes, the process 700 is described from the perspective of a computer system.

Figure 8A:
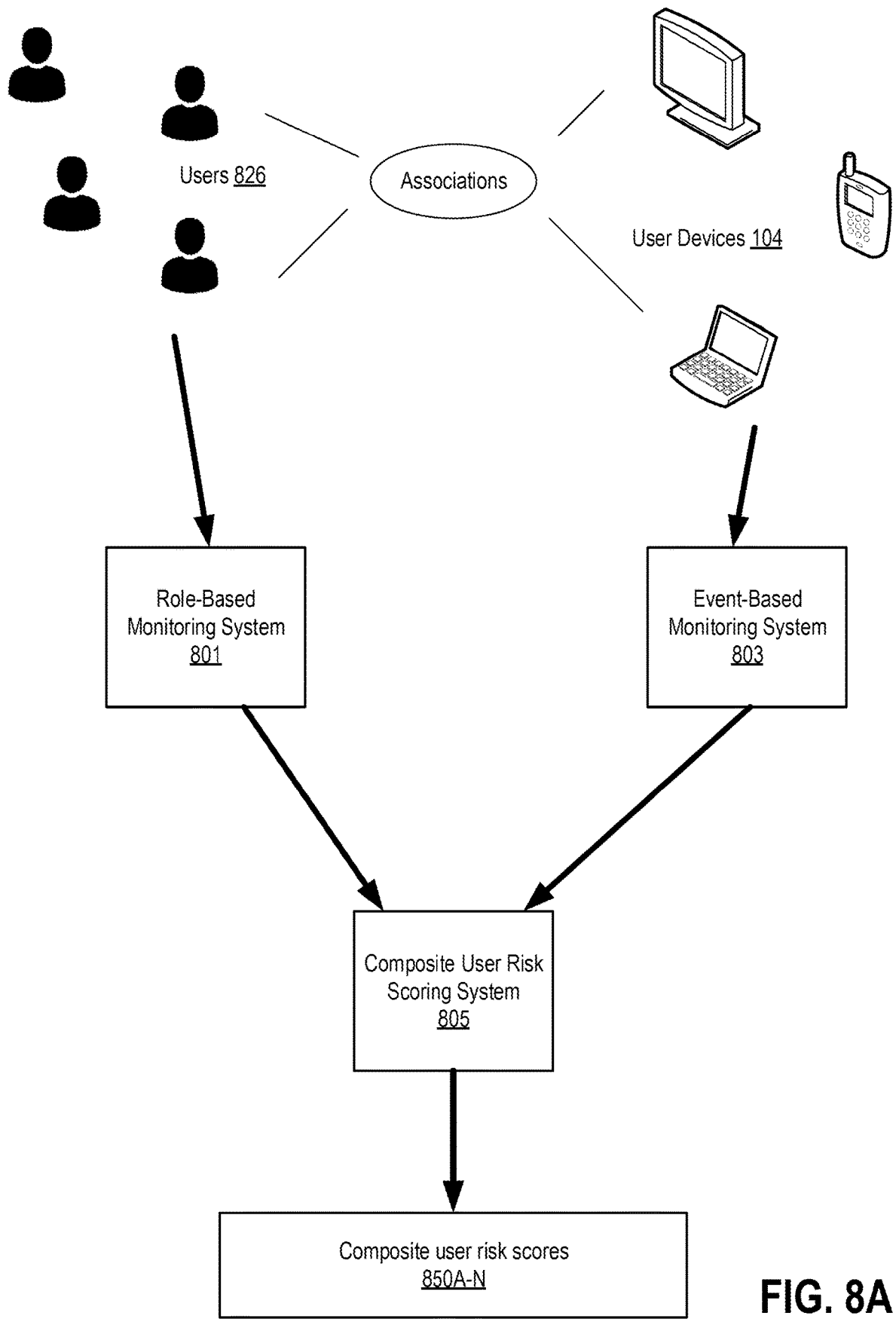
FIG. 8A is a conceptual diagram for determining composite risk scores for users in an enterprise.
Figure 8B:
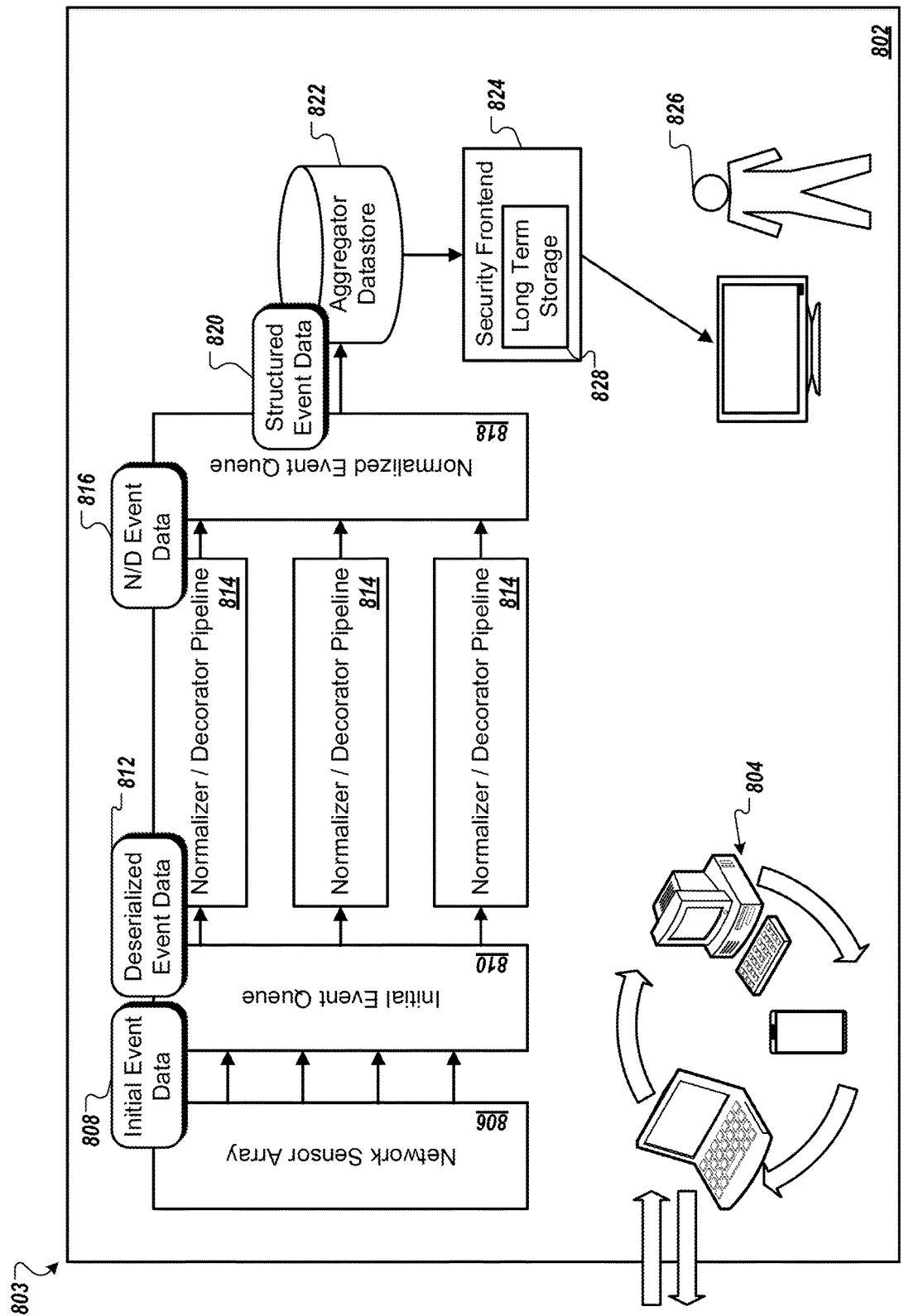
FIGS. 8B-C are block diagrams of an example system for generating events in response to network activity.
Figure 8C:
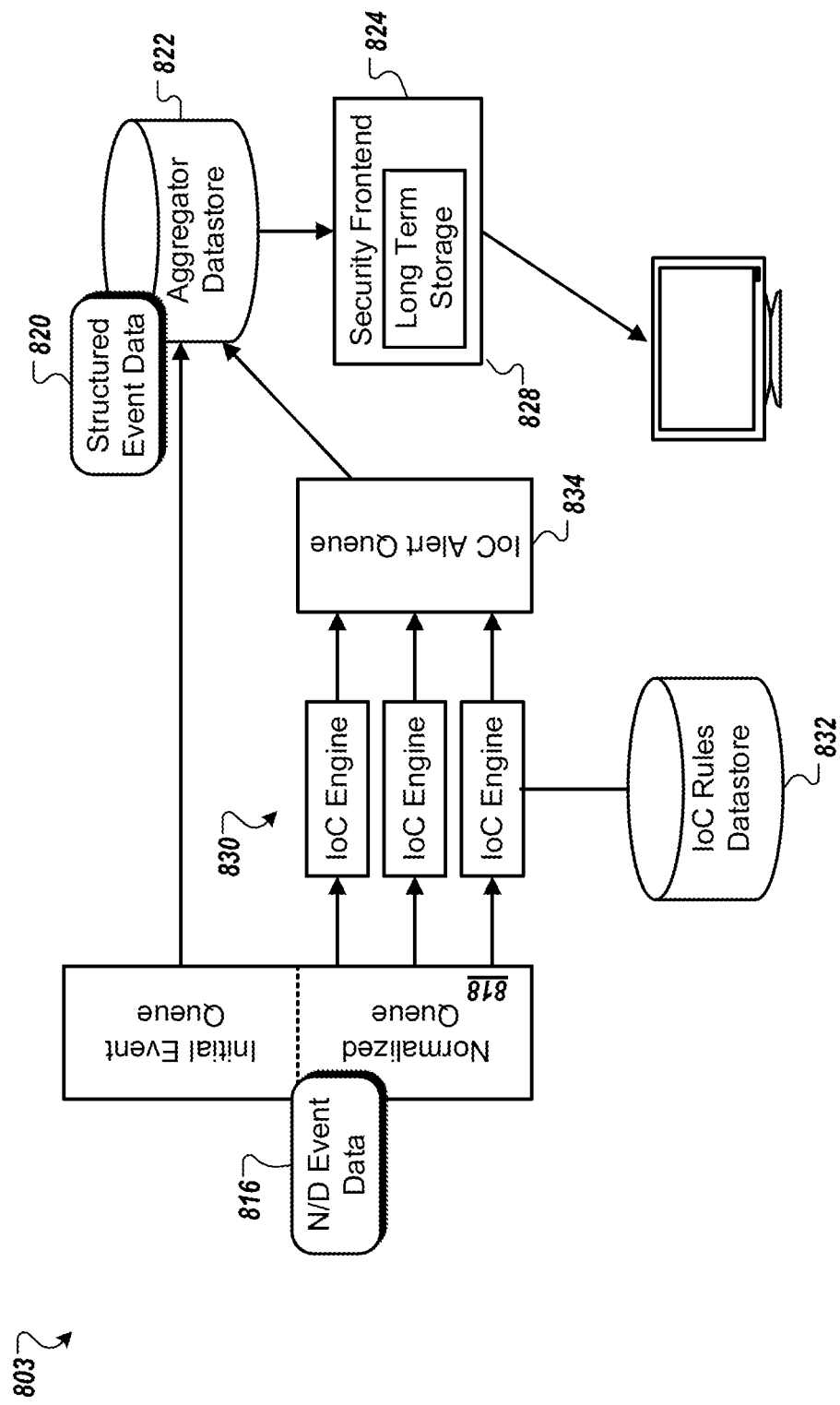

Referring to the process 700 in FIG. 7A, the computer system can receive event alerts in 702. The event alerts can be received in real-time, as they are generated, logged, and/or analyzed by a computer system, such as a security system. The event alerts can also be received in batches at predetermined time intervals (e.g., once a day, every 12 hours, every 5 hours, every other day, etc.). Refer to FIGS. 8A-C for additional discussion on generating the event alerts.

The computer system can determine information associated with the event alerts in 704. This information can be determined from metadata or other information that is logged by the computer system and/or a security system when an event occurs and/or triggers an alert. The computer system can determine when and/or where the event was alerted within the enterprise network. The computer system can identify an IP address, email, or other identifier that can then be used to pair the event alert with a user in the enterprise. The computer system can also identify a type of event that was alerted. The type of event can be used by the computer system to determine how many points to allocate to an associated user's event-based risk score. The type of event can be identifiable from a tag that is associated with the event alert. In other words, when the event alerts, a tag can be generated (e.g. by a security system) that associates the event with a particular risk category.

In 706, the computer system can pair event alerts with users based on the information. As mentioned above, the information can include an IP address, email, or other objective identifier. This objective identifier can identify a user who engaged in the activity that triggered an alert. Therefore, the computer system can pair or associate the event alerts with users in the enterprise by using the objective identifiers.

The computer system can cache user-event pairings (708). These pairings can be temporarily stored at the computer system. Caching the pairings can be beneficial to increase processing power and efficiency when determining scores for the associated users. Sometimes, the computer system can store the tags, in association with the user (e.g. by using the unique identifier), that are associated with the event alerts in a data store.

Optionally, the computer system can determine and/or update user composite risk scores based on the user-event pairings (710). More particularly, the computer system can determine and/or update a user's event-based risk score based on the user-event pairings, which, in turn, can affect the user's composite risk score. The computer system can then aggregate the newly determined event-based risk score with a role-based risk score of the user to determine the user's composite risk score.

In some implementations, the computer system may not perform block 710. The computer system can determine that a composite risk score should be determined and/or updated once a predetermined quantity of user-event pairings are cached over a predetermined period of time. For example, a user may be associated with one new event alert over the course of 30 days, which may not be sufficient to warrant updating the user's event-based risk score and, consequently, the user's composite risk score.

In some implementations, the computer system can update the user's composite risk score by depreciating the user's event-based risk score in 710. If, for example, a particular user is associated with no event alerts during the predetermined period of time, the computer system can depreciate the user's event-based risk score by a predetermined amount (or quantity of points). If, as another example, a particular user is associated with a quantity of event alerts during the period of time that is less than a predetermined threshold quantity (or less than quantities of associations for other users during the period of time), the computer system can depreciate the user's event-based risk score by the predetermined amount.

The computer system can then determine whether there are more event alerts in 712. If there are more event alerts, the computer system can return to 702 and repeat 704-710 for the remaining event alerts. Thus, the computer system can continue to pair event alerts with users in the enterprise and optionally determine and/or update composite risk scores for users who are paired with event alerts. If there are no more event alerts, the process 700 can stop at the present time. In some implementations, the computer system can proceed to the process 750 in FIG. 7B.

Figure 7B:
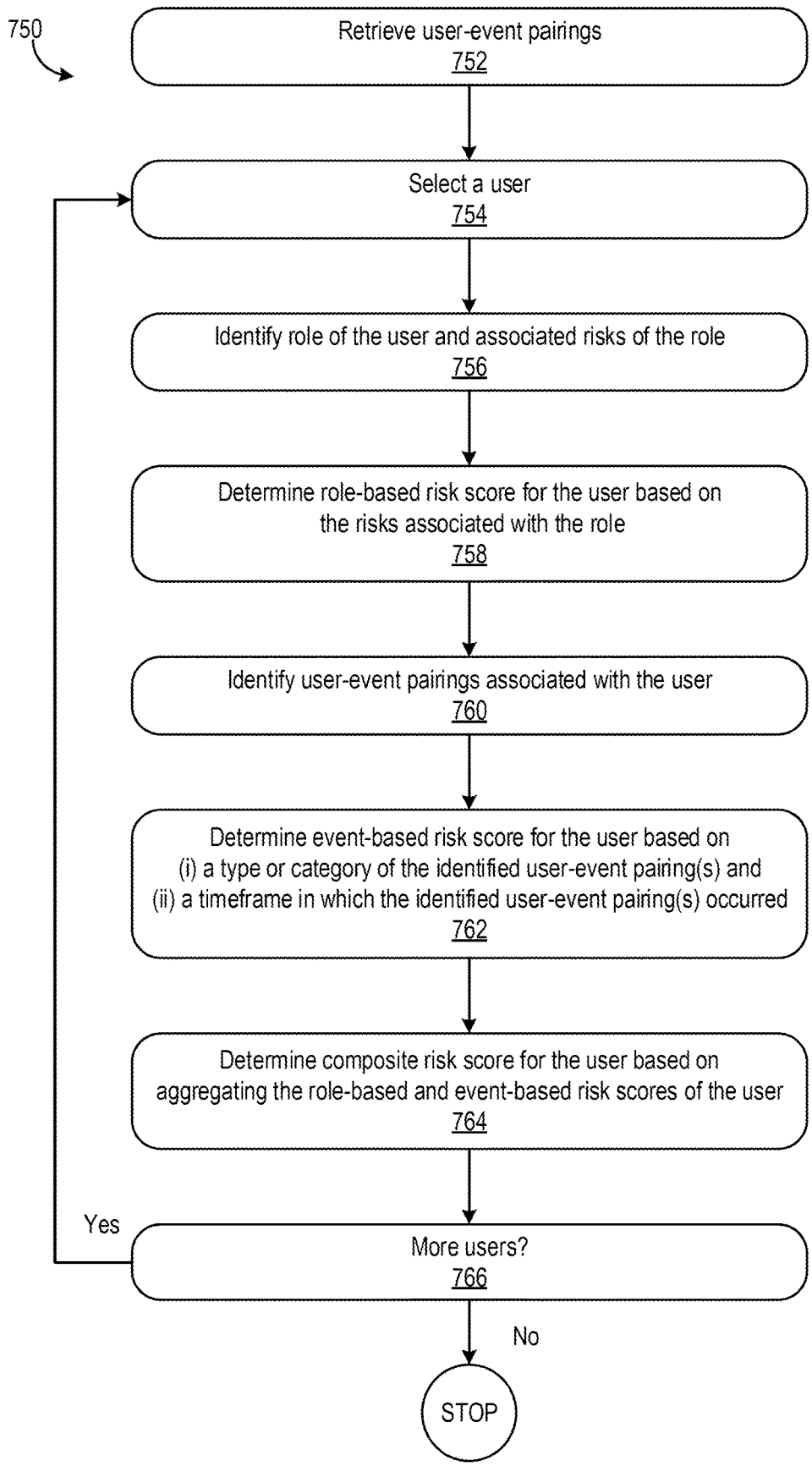
FIG. 7B is a flowchart of a process for determining a composite risk score for a user based on their role-based and event-based risk scores.

FIG. 7B is a flowchart of a process 750 for determining a composite risk score for a user based on their role-based and event-based risk scores. The process 750 can be performed to aggregate or otherwise combine the user's role-based risk score with the user's dynamic event-based risk score. The composite risk score can be used to quantify a potential threat that the user poses to an enterprise at a present time.

The process 750 can be performed by the computer system 102. The process 750 can also be performed by one or more other computing systems, devices, computers, networks, cloud-based systems, and/or cloud-based services. For illustrative purposes, the process 750 is described from the perspective of a computer system.

Referring to the process 750 in FIG. 7B, the computer system can retrieve user-event pairings in 752. The user-event pairings can be used to determine associated users' event-based risk scores. In some implementations, block 752 can be performed later in the process 750, for example after block 758 and before block 760. The computer system can select a user in 754. The computer system can select a user that is associated with an event alert in the retrieved user-event pairings. In some implementations, the computer system can select a user in a particular group, team, or other categorization of users in the enterprise.

In 756, the computer system can identify a role of the user and associated risks of that role. The user's role can be identified from information stored about each user in the enterprise. The information can be stored in and accessed from a data store, such as the data store 106. This information can include the user's role, responsibilities, privileges, entitlements, restrictions, etc. Once the computer system identifies the user's role, the computer system can use a lookup table to determine what risks are associated with that role. For example, executive roles with access to more sensitive, privileged information in the enterprise can be riskier than developer roles that do not have access to such sensitive, privileged information.

The computer system may determine a role-based risk score for the user based on the risks associated with the role (758). The role-based risk score may update when, for example, a user changes roles and/or responsibilities. The role-based risk score can be assigned a quantity of points based on the risks associated with the role. The more risks, the more points may be assigned to the score. The fewer risks, the fewer points may be assigned to the score. The quantity of points to assign can be predetermined by a relevant user, such as a security analyst in the enterprise. The quantity of points to assign can also be dynamically updated/determined by the computer system or a security system based on changes in a landscape of the enterprise (e.g., business rules, policies, management, roles, responsibilities, etc.). The role-based risk score can be a numeric value on a scale of 1 to 100, 0 being a role having no risk and 100 being a role having the most amount of risk.

The computer system can also identify user-event pairings that are associated with the user in 760. The computer system can analyze the user-event pairings that were received in 752 to determine which, if any of those pairings, include the selected user (754). The computer system can use an objective identifier, such as an email address and/or IP address of the selected user, to identify the user-event pairings associated with the user.

Next, the computer system can determine an event-based risk score for the user based on (i) a type or category of the identified user-event pairing(s) and (ii) a timeframe in which the identified user-event pairing(s) occurred (762). The event-based risk score can be a numeric value, such as a value on a scale of 1 to 100, as described in reference to the role-based risk score. The event-based risk score can also be allotted predetermined quantities of points based on (i) and/or (ii).

Some pairing types can be riskier to the enterprise than other pairing types. The riskier pairing types can cause the event-based risk score to be higher than if the pairing type is less risky. For example, a pairing type of transmitting large quantities of internal information via personal email can be identified as high risk. A pairing type of transmitting large quantities of nonproprietary information via personal email can be identified as low risk. The high risk pairing type can result in a higher event-based risk score for the user in comparison to the low risk pairing type.

Timing and/or frequency of the user-event pairings can also impact the event-based risk score. More frequent user-event pairings during a predetermined period of time can result in a higher event-based risk score. After all, a user who is more frequently associated with activity that alerts in a security system of the enterprise may pose a greater risk to the enterprise than a user who is infrequently associated with alerting activity. The user who is infrequently associated with alerting activity may have simply performed an activity by accident that caused the security system to alert. Therefore, the computer system may not be justified to assign that user a high event-based risk score. On the other hand, the user who is frequently associated with alerting activity may be purposely attempting to subvert a security wall or otherwise perform malicious or threatening activities within the enterprise. Thus, the computer system may be justified to assign that user a higher event-based risk score at a present time and/or for the predetermined period of time.

In some implementations, the computer system can cache the determined event-based risk score to then be used in determining a composite risk score for the user. Instead of storing every event-based risk score for the user in the data store, the computer system can store tags associated with each event alerts that were paired with the user and used to determine the event-based risk scores for the user. Storing the tags, instead of the event-based risk scores, in the data store can be beneficial to utilize fewer compute resources and to increase efficiency in subsequent data retrieval and processing. The tags can be used in historical analysis to track activities of the user and to generate a more comprehensive understanding of what risk(s) the user has posed to the enterprise and/or may pose to the enterprise at the present or future time (e.g., identifying repeat offenders).

The computer system may also determine a composite risk score for the user based on aggregating the role-based and event-based risk scores of the user in 764. The computer system can retrieve the role-based risk score from the data store. The computer system can also retrieve the role-based risk score from a temporary cache. Additionally, the computer system can retrieve the event-based risk score from the cache. The computer system can sum the role-based and event-based risk scores of the user and divide the sum by 2 to determine the composite risk score. One or more other statistical and/or averaging techniques can be used. In some implementations, the computer system can use the event-based risk score as the composite risk score and weight the event-based risk score by the role-based risk score of the user.

The computer system can then determine whether there are more users (766). In other words, the computer system can identify whether role-based, event-based, and/or composite risk scores should be determined and/or updated for any other users in the enterprise (or within a particular group and/or team in the enterprise). If there are more users, the computer system can return to 754 and repeat blocks 756-764 for each remaining user. Thus, the computer system can determine and/or update role-based, event-based, and/or composite risk scores for the remaining users. If there are no more users, the process 750 may stop.

FIG. 8A is a conceptual diagram for determining composite risk scores for users in an enterprise. Users 826 of the enterprise can engage in activities on the user devices 104. Such activities can be benign or malicious. The activities can be part of the functions and/or responsibilities of a user 826's job role. Sometimes, the activities may not be part of the user 826's job role. Regardless, associations can be made between activities performed at the user devices 104 and the users 826 in the enterprise. Some associations may be known between the users 826 and the user devices 104. In some implementations, some associations may not be known between the users 826 and the user devices 104.

A role-based monitoring system 801, as described in FIGS. 7A-B, can receive information about the users 826, such as their roles, responsibilities, privileges, entitlements, etc. Using this information, the role-based monitoring system 801 can identify risks associated with each role of each user 826. Using the identified risks, the role-based monitoring system 801 can determine role-based risk scores for the users 826.

An event-based monitoring system 803, as described in FIGS. 7A-B, can receive information about activities or events (e.g., associations with users, user-event pairings, objective identifiers, frequency, timestamp, tag identifying the type of activity or event, etc.) that occur at the user devices 104. The event-based monitoring system 803 is described further in FIGS. 8B-C. Using the received information, the event-based monitoring system 803 can determine dynamic event-based risk scores for the users 826.

A composite risk scoring system 805 can receive the role-based risk scores from the role-based monitoring system 801 and the event-based risk scores from the event-based monitoring system 803. Using the role-based and event-based risk scores, the composite risk scoring system 805 can determine composite risk scores 850A-N. Each of the users 826 can receive a respective composite risk score 850A-N.

The role-based monitoring system 801, the event-based monitoring system 803, and/or the composite user risk scoring system 805 can be part of the user risk scoring engine 602 described in FIG. 6. In some implementations, one or more of the systems 801, 803, and 805 can be separate from each other and/or the user risk scoring engine 602 in FIG. 6.

FIGS. 8B-C are block diagrams of an example system for generating events in response to network activity. The example system depicted in FIGS. 8B-C can be the event-based monitoring system 803. In some implementations, the techniques described in reference to FIGS. 8B-C can be performed by another computing system, such as a security system, in the enterprise.

Referring to FIG. 8B, a network 802 is being protected by one or more security analysts. The security analysts are users that are tasked with monitoring the security state of the network 802 and to prevent malicious activity like malware execution, data exfiltration, etc.

The network 802 is, for example, a local network, intranet, virtual private network, or other data network used by an organization. The network 802 can include networking hardware such as cables, wireless access points, routers, gateways, firewalls, etc., that work together to allow resident machines 804 to communicate with other resident machines 804 and with computing resources outside of the network 802. The resident machines 804 can include, but are not limited to, personal computers, servers, and mobile devices.

Operations of the network 802 and resident machines 804 may come under attack from malicious actors—users and/or automated services that seek to exploit computing resources they do not own or have authorization to use. The event-based monitoring system 804 can be configured to provide monitoring functionality that generates data based on the activity on the network—including malicious activity. This monitoring can then be provided to a security analyst that is tasked with stopping or attempting to stop these attacks through various types of security responses.

When the resident machines 804 participate in data transmission on the network 802, an array of network security sensors 806 can sense the network activity and generate data for one or more events that represent the activity. For example, the sensors 806 can be connected to the physical layer of the network (e.g., wires, wireless data transmissions) and be configured to respond when signals indicate that network activity is happening. The sensors can respond to this sensing by creating data even when the sensed activity is not addressed to or involve the sensors 806. Depending on the size and scale of the network 802, one array of network sensors 806 may have more or fewer sensors than another array of network sensors. In various examples, hundreds, thousands, tens of thousands, or hundreds of thousands of sensors can be used, although more or fewer are possible. In addition or in the alternative, the sensors 806 can also record non-network activity. For example, when devices hosted on the network perform sensitive operations (e.g., accessing a sensitive data repository, executing applications, etc.), the sensors 806 can sense these activities.

The sensors can provide the initial event data 808 to one or more initial event queues 810. The initial event data 808 may include data objects that do not conform to any single format or structure, may be out of chronological order, and may otherwise be non-homogeneous. The initial event queues 810 can receive the initial event data 808 and deserialize the data objects of the initial event data 808 into deserialized event data 812. The deserialized event data 812 can include all or part of the data included in the initial event data 808, and has been deserialized. In general, serialization of data involves the transforming or reconfiguring of data so that it can be stored, transmitted, etc. For example, the serialization process performed by the initial event queues 810 can include padding out short data strings or removing redundant data, decompressing compressed data, changing the format, etc.

One or more normalizer/decorator pipelines 814 can receive the deserialized event data 812 from the initial event queues 810 and process the deserialized event data 812 into normalized/decorated event data 816. For example, the normalizer/decorator pipelines 814 can normalize the deserialized event data 812 by editing its structure so that the structure complies with one or more standards, and the normalizer/decorator pipelines 814 can decorate the deserialized event data 812 by adding data to the events from other sources (e.g., timestamps, geo-location data, threat intelligence data, a connection-identifier.)

The number of normalizer/decorator pipelines 814 can change depending on the load of the initial event queues 810. For example, new instances of normalizer/decorator pipelines 814 can be generated and used when a backlog of deserialized event data 812 is prepared by the initial event queue 810, and these normalizer/decorator pipelines 814 can be released and idle when the backlog falls under a threshold size, is empty, begins trending downward, etc.

In some cases, the ramp-up of the normalizer/decorator pipelines 814 can be more sensitive than the ramp-down. That is, a particular growth in backlog may cause more normalizer/decorator pipelines 814 to be instantiated faster than a similar reduction in backlog. This may be accomplished, for example, by adding N normalizer/decorator pipelines 814 every time-unit (e.g., second, 30 seconds, minute, hour) a backlog over a certain size is seen, and removing only M normalizer/decorator pipelines 514 every time-unit the backlog over a certain size is not seen, where N is greater than M (e.g., N=2; M=1; e.g., N=4; M=1.) In addition to backlog size, other parameters are possible including, but not limited to, rate of change of backlog, priority of traffic resident in the backlog, price of allocation of resources, etc.

The event-based monitoring system 803 can be configured to use the normalizer/decorator pipelines 814 to efficiently make matches and append flags to data. One such type of flag is an Indicator of Compromise (IoC) that records information a compromise. IoC can generally include single pieces of information that can be quickly examined and flagged. By using simple, single data matching, fewer computational resources may be required compared to more complex matching. By appending the IoC with the normalizer/decorator pipelines 814, later elements such as a security frontend 824 may be executed with less resources than would otherwise be needed. For example, the normalizer/decorator pipelines 814 can be configured to match in-network activity to lists of known malicious indicators. This includes hashes (MD5, SHA1 SHA256) of a known-malicious file (e.g. a document with a script containing malicious activity) or an IP address of an endpoint in a network communication. This configuration can tie IoCs to related data early in the process, removing a need to keep tables mapping network activity to IoCs for use later in the pipeline. Other types of matching include, but are not limited to, matching subdomains to top-level domains, use of regular expressions, etc.

An aggregator data store 822 can collect structured event data 820 and store the structured event data 820 in an indexable and searchable data store 822. The aggregator data store 822 may store all of the structured event data 820 until the aggregator data store 822 is full or otherwise storing at least a threshold amount of data or data older than a threshold period of time. When this volume or age of data is reached, the oldest data may be discarded, making room for new data. That is, the aggregator data store 822 may operate as a rolling buffer that provides storage for the new data, discarding the old data. Other storage systems (not shown here for clarity) can be used for long-term or archival storage, which may provide less expensive storage that is slower to respond to queries.

The security frontend 824 can provide a graphical user interface (GUI) to a computer and/or other devices used by a security analyst 826. The GUI can provide the security analyst 826 with access to the structured event data 820 that is stored in the aggregator data store 822 in a way that allows the security analyst 826 to understand and more quickly investigate security events of the network 802 that may or may not be malicious. For example, the GUI can provide the security analyst 826 with tools to draft queries, test the queries on the structured event data 820, and then store the same query for use as a rule on future events that are collected from the network 802.

In addition, the security frontend 824 can execute one or more rules on the incoming structured event data 820. These rules may contain conditional statements that, if ever found true on incoming event data, trigger response statements. These response statements can include instructions for automated responses (e.g., quarantining a device on the network 802, subjecting a data connection to enhanced analysis) as well as alerts to communicate the fact that a rule was triggered. These alerts may be transmitted to users via one or more channels that include email, text message, and the generation of a ticket in a ticketing system.

The use of the structure of the event-based system 803 allows for efficient generation of alerts and processing of network events. For example, as shown here, both normalization and decoration of event data with IoCs can be performed as part of the ingestion of the network data instead of later once event data objects are created and ingested into storage. By using this type of architecture and performing decoration at the time of ingestion, the computing resources needed for decoration can be reduced. As done here, decoration with IoCs can be as simple as maintaining a dictionary of key:value pairs for various fields, and as the normalizer/decorator pipelines 814 normalizes the event data, the event data value can be run through the dictionary.

Any hits in the dictionary, where a field of the event data object matches a key entry, can result in the copying of the key:value pair to the event data object. As will be understood, this can be implemented in a very efficient and thus fast-to-process format that scales slowly as the number of events grows and as the size of the dictionary grows. By way of comparison, decorating events after they already are stored in a datastore can involve far more complex Boolean operations, repetitive traversals, etc. that have the result of becoming less performant as the number of events or size of the dictionary grows.

In this way, extensive and fine-grain event generation, storage, and analysis can be created with the event-based monitoring system 803. In one example, an enterprise data network that connects hundreds of physical locations and millions of devices can be effectively and efficiently monitored. In this example, tens of thousands sensors 806 can produce tens of trillions of events a day (including hundreds of thousands or millions of events a second). The event-based monitoring system 803 can be created using hardware resources that may be well within an enterprise of this size and scope, and provide access to events in the aggregator datastore 822 within seconds of the event occurring on the network. Further, the rules may be run on the events every minute or every handful of minutes.

Further, the use of a rolling buffer in the aggregator datastore 822 can ensure that the most relevant events—the newest ones—are always available for analysis. In the above example, a week's worth of events can be stored in the rolling buffer. Some indexing can be built on the entire week's worth of data, with enhanced indexing being built on the newest data. In this way, rules to identify potentially malicious activity can be run on the newest data at high speed and efficiency, without requiring re-indexing of all data.

FIG. 8C is a block diagram of optional elements of the event-based monitoring system 803. As shown here, the normalized event queue 818 can include one or more normalized queues from which network event data can be provided to IoC engines 830 for processing against IoC rules. The IoC engines 830 can receive network event data, either structured or unstructured, along with other pertinent data to the event data, such as additional information added to the network event data in the normalizer/decorator pipelines 814. The IoC engines 830 can access one or more IoC rules from the IoC rules datastore 832 and compare the normalized event data 816 against these rules. If a normalized event data 816 matches an IoC rule, the event data can be decorated with information about the IoC rule, such as a flag or code associated with the matching rule being added to the event data that indicates the implications of the match (e.g., domain for network event is known bad/malicious domain, etc.). These decorated events can be provided to the aggregator datastore 822 for processing against the more computationally intensive rules.

The rules in the IoC rules datastore 832 can include one or more rules that are easy to process (e.g., require few computational resources to run) relative to the rules run against the aggregator datastore 822. Bifurcating processing of the more computationally simple IoC rules from the more complex rules run against the aggregator datastore 822 across different systems can create greater processing efficiency and use of processing resources. The IoC rules can include, for instance, simple pattern or string matching tests. For example, one test may be to compare an MD5 hash of an email attachment against a corpus of MD5 hashes from known-malicious historical email attachments. Since MD5 hashes are not truly unique and hash-collisions of different files are possible, this processing can provide a likely indicator of potentially malicious email traffic. However, because comparing MD5 hashes are computationally simple, this test can be performed quickly and can provide an efficient determination of potentially malicious events.

In some implementations, the IoC rules datastore 832 can include a dynamic rules engine to perform comparison based on the rules stored in the IoC rules datastore 832. When the rules change, the IoC rules datastore 832 can detect the change and initiate an engine rebuild to create a second rules engine using the updated rules. While the rebuild is being performed, traffic can continue to be routed to the first, older, rules engine. Then, when the rebuild is completed, the IoC rules datastore 832 can route new traffic to the second rules engine. Once all the traffic routed to the first rules engine is acted upon, the IoC rules datastore 832 can decommission the old rules engine.

The IoC engine deposits the structured event data 820 into an IoC alert queue 834. The IoC alert queue 834 can collect the received structured event data 820 for storage in the aggregator datastore 822. As described in reference to FIG. 8B, the structured event data 820 can then be outputted in GUIs at user devices of the security analysts.

Figure 9:
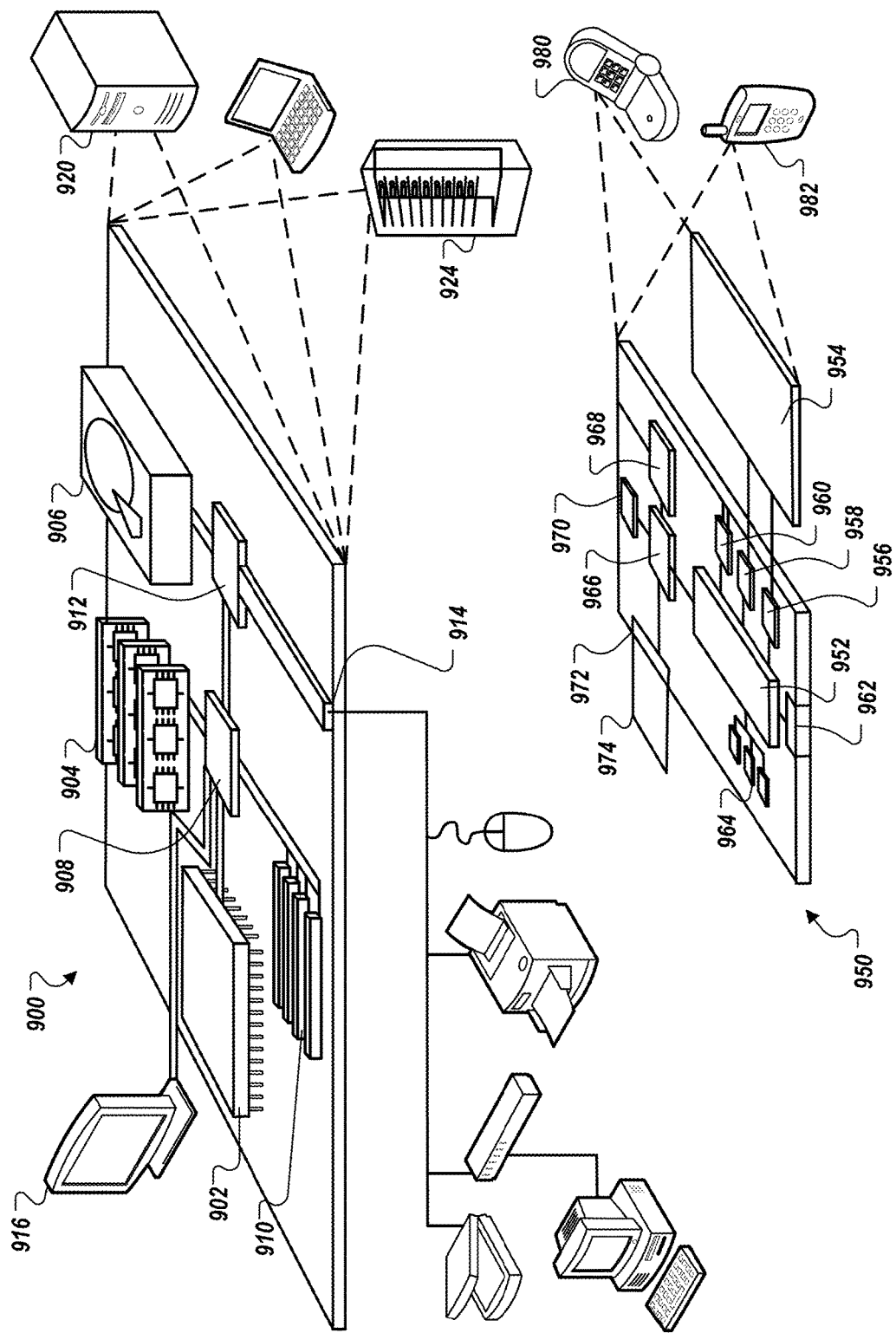
FIG. 9 is a schematic diagram that shows an example of a computing device and a mobile computing device.

FIG. 9 shows an example of a computing device 900 and an example of a mobile computing device that can be used to implement the techniques described here. The computing device 900 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smart-phones, and other similar computing devices. The components shown here, their connections and relationships, and their functions, are meant to be exemplary only, and are not meant to limit implementations of the inventions described and/or claimed in this document.

The computing device 900 includes a processor 902, a memory 904, a storage device 906, a high-speed interface 908 connecting to the memory 904 and multiple high-speed expansion ports 910, and a low-speed interface 912 connecting to a low-speed expansion port 914 and the storage device 906. Each of the processor 902, the memory 904, the storage device 906, the high-speed interface 908, the high-speed expansion ports 910, and the low-speed interface 912, are interconnected using various busses, and can be mounted on a common motherboard or in other manners as appropriate. The processor 902 can process instructions for execution within the computing device 900, including instructions stored in the memory 904 or on the storage device 906 to display graphical information for a GUI on an external input/output device, such as a display 916 coupled to the high-speed interface 908. In other implementations, multiple processors and/or multiple buses can be used, as appropriate, along with multiple memories and types of memory. Also, multiple computing devices can be connected, with each device providing portions of the necessary operations (e.g., as a server bank, a group of blade servers, or a multi-processor system).

The memory 904 stores information within the computing device 900. In some implementations, the memory 904 is a volatile memory unit or units. In some implementations, the memory 904 is a non-volatile memory unit or units. The memory 904 can also be another form of computer-readable medium, such as a magnetic or optical disk.

The storage device 906 is capable of providing mass storage for the computing device 900. In some implementations, the storage device 906 can be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product can also contain instructions that, when executed, perform one or more methods, such as those described above. The computer program product can also be tangibly embodied in a computer- or machine-readable medium, such as the memory 904, the storage device 906, or memory on the processor 902.

The high-speed interface 908 manages bandwidth-intensive operations for the computing device 900, while the low-speed interface 912 manages lower bandwidth-intensive operations. Such allocation of functions is exemplary only. In some implementations, the high-speed interface 908 is coupled to the memory 904, the display 916 (e.g., through a graphics processor or accelerator), and to the high-speed expansion ports 910, which can accept various expansion cards (not shown). In the implementation, the low-speed interface 912 is coupled to the storage device 906 and the low-speed expansion port 914. The low-speed expansion port 914, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

The computing device 900 can be implemented in a number of different forms, as shown in the figure. For example, it can be implemented as a standard server 920, or multiple times in a group of such servers. In addition, it can be implemented in a personal computer such as a laptop computer 922. It can also be implemented as part of a rack server system 924. Alternatively, components from the computing device 900 can be combined with other components in a mobile device (not shown), such as a mobile computing device 950. Each of such devices can contain one or more of the computing device 900 and the mobile computing device 950, and an entire system can be made up of multiple computing devices communicating with each other.

The mobile computing device 950 includes a processor 952, a memory 964, an input/output device such as a display 954, a communication interface 966, and a transceiver 968, among other components. The mobile computing device 950 can also be provided with a storage device, such as a micro-drive or other device, to provide additional storage. Each of the processor 952, the memory 964, the display 954, the communication interface 966, and the transceiver 968, are interconnected using various buses, and several of the components can be mounted on a common motherboard or in other manners as appropriate.

The processor 952 can execute instructions within the mobile computing device 950, including instructions stored in the memory 964. The processor 952 can be implemented as a chipset of chips that include separate and multiple analog and digital processors. The processor 952 can provide, for example, for coordination of the other components of the mobile computing device 950, such as control of user interfaces, applications run by the mobile computing device 950, and wireless communication by the mobile computing device 950.

The processor 952 can communicate with a user through a control interface 958 and a display interface 956 coupled to the display 954. The display 954 can be, for example, a TFT (Thin-Film-Transistor Liquid Crystal Display) display or an OLED (Organic Light Emitting Diode) display, or other appropriate display technology. The display interface 956 can comprise appropriate circuitry for driving the display 954 to present graphical and other information to a user. The control interface 958 can receive commands from a user and convert them for submission to the processor 952. In addition, an external interface 962 can provide communication with the processor 952, so as to enable near area communication of the mobile computing device 950 with other devices. The external interface 962 can provide, for example, for wired communication in some implementations, or for wireless communication in other implementations, and multiple interfaces can also be used.

The memory 964 stores information within the mobile computing device 950. The memory 964 can be implemented as one or more of a computer-readable medium or media, a volatile memory unit or units, or a non-volatile memory unit or units. An expansion memory 974 can also be provided and connected to the mobile computing device 950 through an expansion interface 972, which can include, for example, a SIMM (Single In Line Memory Module) card interface. The expansion memory 974 can provide extra storage space for the mobile computing device 950, or can also store applications or other information for the mobile computing device 950. Specifically, the expansion memory 974 can include instructions to carry out or supplement the processes described above, and can include secure information also. Thus, for example, the expansion memory 974 can be provide as a security module for the mobile computing device 950, and can be programmed with instructions that permit secure use of the mobile computing device 950. In addition, secure applications can be provided via the SIMM cards, along with additional information, such as placing identifying information on the SIMM card in a non-hackable manner.

The memory can include, for example, flash memory and/or NVRAM memory (non-volatile random access memory), as discussed below. In some implementations, a computer program product is tangibly embodied in an information carrier. The computer program product contains instructions that, when executed, perform one or more methods, such as those described above. The computer program product can be a computer- or machine-readable medium, such as the memory 964, the expansion memory 974, or memory on the processor 952. In some implementations, the computer program product can be received in a propagated signal, for example, over the transceiver 968 or the external interface 962.

The mobile computing device 950 can communicate wirelessly through the communication interface 966, which can include digital signal processing circuitry where necessary. The communication interface 966 can provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication can occur, for example, through the transceiver 968 using a radio-frequency. In addition, short-range communication can occur, such as using a Bluetooth, WiFi, or other such transceiver (not shown). In addition, a GPS (Global Positioning System) receiver module 970 can provide additional navigation- and location-related wireless data to the mobile computing device 950, which can be used as appropriate by applications running on the mobile computing device 950.

The mobile computing device 950 can also communicate audibly using an audio codec 960, which can receive spoken information from a user and convert it to usable digital information. The audio codec 960 can likewise generate audible sound for a user, such as through a speaker, e.g., in a handset of the mobile computing device 950. Such sound can include sound from voice telephone calls, can include recorded sound (e.g., voice messages, music files, etc.) and can also include sound generated by applications operating on the mobile computing device 950.

The mobile computing device 950 can be implemented in a number of different forms, as shown in the figure. For example, it can be implemented as a cellular telephone 980. It can also be implemented as part of a smart-phone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of the disclosed technology or of what may be claimed, but rather as descriptions of features that may be specific to particular embodiments of particular disclosed technologies. Certain features that are described in this specification in the context of separate embodiments can also be implemented in combination in a single embodiment in part or in whole. Conversely, various features that are described in the context of a single embodiment can also be implemented in multiple embodiments separately or in any suitable subcombination. Moreover, although features may be described herein as acting in certain combinations and/or initially claimed as such, one or more features from a claimed combination can in some cases be excised from the combination, and the claimed combination may be directed to a subcombination or variation of a subcombination. Similarly, while operations may be described in a particular order, this should not be understood as requiring that such operations be performed in the particular order or in sequential order, or that all operations be performed, to achieve desirable results. Particular embodiments of the subject matter have been described. Other embodiments are within the scope of the following claims.

What is claimed is:

1. A method for identifying users within an enterprise who pose heightened security risks to the enterprise, the method comprising:

receiving, by a computing system, information about users in the enterprise, the information including a unique identifier associated with each user and network events corresponding to activities performed by the users that are detected by one or more network sensors and associated with the unique identifiers of the users, wherein the unique identifiers comprise login credentials for the users;

receiving, by the computing system and from the one or more network sensors, in-network data associated with the network events;

deserializing, by the computing system, the in-network data associated with the network events to generate deserialized data, wherein the deserializing comprises reconfiguring the in-network data for subsequent use by the computing system;

applying, by a decorator pipeline of the computing system, indicators of compromise (IoC) rules that correspond to network security of the enterprise to the deserialized data to identify a subset of the deserialized data that matches the IoC rules;

appending, by the decorator pipeline of the computing system, flags to the subset of the deserialized data, wherein the flags correspond to the matched IoC rules;

grouping, by the computing system, the users into a plurality of groups based on at least one grouping feature and the decorated subset of the deserialized data that corresponds to activities performed by the users, the at least one grouping feature including, for each of the users, at least one of behavior, activity, role, department, region, role-based risk score, event-based risk score, and composite risk score;

identifying, by the computing system and for each of the plurality of groups, normalized behavior of the group, wherein the normalized behavior represents expected behavior of the users in the group;

generating, by the computing system and for each of the users in each of the plurality of groups, a composite risk score based on a deviation of activity in the decorated network events associated with the user from the normalized behavior of the group;
identifying, by the computing system and for each of the plurality of groups, a subset of users in the group to be added to a watch list based on the respective composite risk scores, wherein the watch list is configured to monitor users that do not have casefiles, wherein the casefiles are generated for the users once a threshold amount of the decorated subset of the deserialized data is attributed to the respective users;
adding, by the computing system, the subset of users to the watch list;
storing, by the computing system, the watch list in a data store; and
dynamically updating, by the computing system, the watch list based on removing one or more users from the watch list that are attributed with the threshold amount of the decorated subset of the deserialized data required for generating the casefiles.

2. The method of claim 1, wherein the information about each of the users further includes a role of the user and event alerts that are associated with the user.

3. The method of claim 1, further comprising:
retrieving, by the computing system and from the data store, an event log that is associated with the user;
serving up, by the computing system, the event log of the user to analyze activity that is attributed to the user; and
assigning, by the computing system, the user to at least one group based on the analyzed activity in the event log being within a threshold deviation from the normalized behavior of the at least one group.

4. The method of claim 1, further comprising ranking, by the computing system and for each of the groups in the plurality of groups, the users in the group based on the respective composite risk scores.

5. The method of claim 1, wherein identifying, by the computing system and for each of the plurality of groups, a subset of users in the group to be added to a watch list is based on at least one of (i) determining that one or more users in the group have composite risk scores that exceed a threshold score and (ii) determining that the one or more users are ranked in a top predetermined quantity of users in the group.

6. The method of claim 1, wherein the composite risk score is an aggregation of a role-based risk score and an event-based risk score of the user.

7. The method of claim 1, further comprising:
generating, by the computing system, a watch list report based on the watch list; and
transmitting, by the computing system and to a user device, the watch list report to be outputted in a graphical user interface (GUI) display at a user device.

8. The method of claim 1, further comprising:
adding, by the computing system, a user in the enterprise to the watch list based on the user satisfying one or more watch list criteria; and
ranking, by the computing system, the users in the watch list.

9. The method of claim 8, wherein the one or more watch list criteria includes a type of user activity that matches an activity type monitored by the watch list.

10. The method of claim 8, wherein the one or more watch list criteria includes a frequency of user activity that exceeds a threshold frequency.

11. The method of claim 8, wherein the one or more watch list criteria includes a quantity of user-event alert pairings that exceeds a threshold quantity of pairings.

12. The method of claim 8, wherein the one or more watch list criteria includes a casefile not being associated with the user.

13. The method of claim 8, wherein the one or more watch list criteria includes accessing a risky website over a predetermined period of time.

14. The method of claim 8, wherein the one or more watch list criteria includes the user activity triggering one or more rules associated with authorized users.

15. The method of claim 8, wherein the one or more watch list criteria includes a false positive rate of user-event alert pairings that exceeds a threshold rate.

16. The method of claim 1, further comprising adding, by the computing system, a user in the enterprise to the watch list based on:
determining whether the user is associated with a casefile;
determining whether the user is associated with a quantity of event alerts that exceeds the threshold amount of the decorated subset of the deserialized data; and
adding the user to the watch list based on a determination that the user is associated with the quantity of event alerts that exceeds the threshold amount of the decorated subset of the deserialized data.

17. The method of claim 1, further comprising removing, by the computing system, a user from the watch list based on:
retrieving an event log associated with the user;
serving up the event log to analyze one or more activities associated with the user over a predetermined period of time;
determining, based on analyzing the one or more activities associated with the user, whether the user satisfies one or more criteria to be removed from the watch list; and
removing the user from the watch list based on a determination that the user satisfies the one or more criteria,
wherein the one or more criteria is selected from a group consisting of: (i) an amount of time on the watch list exceeding a threshold amount of time, (ii) a frequency of associated event alerts that is less than a threshold frequency, (iii) a quantity of associated event alerts that is less than a threshold quantity, (iv) one or more risk scores that is less than one or more threshold scores, and (v) a deviation from the normalized behavior of the group that is less than a threshold deviation.

18. The method of claim 17, further comprising:
determining, based on removing the user from the watch list, whether the user satisfies another criterion to generate a casefile for the user; and
generating the casefile for the user based on a determination that the user satisfies the another criterion,
wherein the another criterion is selected from a group consisting of: (i) the quantity of associated event alerts exceeding a second threshold quantity, (ii) the frequency of associated event alerts exceeding a second threshold frequency, (iii) the one or more risk scores exceeding one or more second threshold scores, and (iv) the deviation from the normalized behavior of the group exceeding a second threshold deviation, wherein the second threshold quantity, the second threshold frequency, the second threshold scores, and the second threshold deviation are different than the threshold quantity, the threshold frequency, the threshold scores, and the threshold deviation, respectively.

19. A system for identifying users within an enterprise who pose heightened security risks to the enterprise, the system comprising:

at least one processor; and a memory device storing instructions that are operable, when executed by the at least one processor one or more computers, to cause the at least one processor to perform operations comprising:

receiving information about users in the enterprise, the information including a unique identifier associated with each user and network events corresponding to activities performed by the users that are detected by one or more network sensors and associated with the unique identifiers of the users, wherein the unique identifiers comprise login credentials for the users;

receiving, from the one or more network sensors, in-network data associated with the network events;

deserializing the in-network data associated with the network events to generate deserialized data, wherein the deserializing comprises reconfiguring the in-network data for subsequent use by the system;

applying, by a decorator pipeline, indicators of compromise (IoC) rules that correspond to network security of the enterprise to the deserialized data to identify a subset of the deserialized data that matches the IoC rules;

appending flags to the subset of the deserialized data, wherein the flags correspond to the matched IoC rules;

grouping the users into a plurality of groups based on at least one grouping feature and the decorated subset of the deserialized data that corresponds to activities performed by the users, the at least one grouping feature including, for each of the users, at least one of behavior, activity, role, department, region, role-based risk score, event-based risk score, and composite risk score;

identifying, for each of the plurality of groups, normalized behavior of the group, wherein the normalized behavior represents expected behavior of the users in the group;

generating, for each of the users in each of the plurality of groups, a composite risk score based on a deviation of activity in the decorated network events associated with the user from the normalized behavior of the group;

identifying, for each of the plurality of groups, a subset of users in the group to be added to a watch list based on the respective composite risk scores, wherein the watch list is configured to monitor users that do not have casefiles, wherein the casefiles are generated for the users once a threshold amount of the decorated subset of the deserialized data is attributed to the respective users;

adding the subset of users to the watch list;

storing the watch list in a data store; and dynamically updating the watch list based on removing one or more users from the watch list that are attributed with the threshold amount of the decorated subset of the deserialized data required for generating the casefiles.

20. The system of claim 19, further comprising:

retrieving an event log that is associated with the user;

serving up the event log of the user to analyze activity that is attributed to the user; and assigning the user to at least one group based on the analyzed activity in the event log being within a threshold deviation from the normalized behavior of the at least one group.

\* \* \* \* \*